(12) United States Patent
Sakai et al.

(10) Patent No.: US 11,244,275 B2
(45) Date of Patent: Feb. 8, 2022

(54) LOGISTICS SUPPORT DEVICE, LOGISTICS SUPPORT METHOD, AND STORAGE MEDIUM

(71) Applicants: Kabushiki Kaisha Toshiba, Minato-ku (JP); Toshiba Digital Solutions Corporation, Kawasaki (JP)

(72) Inventors: Masaki Sakai, Hino (JP); Chizuko Shimamura, Nakano (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 197 days.

(21) Appl. No.: 16/492,471

(22) PCT Filed: Sep. 25, 2017

(86) PCT No.: PCT/JP2017/034589
§ 371 (c)(1),
(2) Date: Sep. 9, 2019

(87) PCT Pub. No.: WO2018/168031
PCT Pub. Date: Sep. 20, 2018

(65) Prior Publication Data
US 2021/0150467 A1    May 20, 2021

(30) Foreign Application Priority Data
Mar. 14, 2017  (JP) .............................. JP2017-048993

(51) Int. Cl.
*G06Q 10/08* (2012.01)
*B60P 3/20* (2006.01)
(Continued)

(52) U.S. Cl.
CPC ............ *G06Q 10/0832* (2013.01); *B60P 3/20* (2013.01); *F25D 11/003* (2013.01);
(Continued)

(58) Field of Classification Search
CPC ..... G06Q 50/00; G06Q 50/06; G06Q 10/0631
See application file for complete search history.

(56) References Cited

U.S. PATENT DOCUMENTS 4,844,622 A * 7/1989 Weiss ..................... G01K 3/04
                                                    374/102
5,927,078 A * 7/1999 Watanabe ............... F25B 21/02
                                                    62/3.6
(Continued)

FOREIGN PATENT DOCUMENTS

CN       205670272 U     11/2016
JP       2002-71253 A     3/2002
(Continued)

OTHER PUBLICATIONS

International Search Report dated Dec. 19, 2017 in PCT/JP2017/034589 filed Sep. 25, 2017.

*Primary Examiner* — Jeff Zimmerman
*Assistant Examiner* — Duane N. Moore
(74) *Attorney, Agent, or Firm* — Oblon, McClelland, Maier & Neustadt, L.L.P.

(57) ABSTRACT

A logistics support device includes a deriver and an instruction controller. The deriver performs, when a storage configured to store an article is mounted in a moving body and stays in a work place at which work is performed on an article stored in the storage in a delivery business, statistics processing on environmental information on an environmental change inside the storage. The instruction controller outputs an instruction on the basis of a result of the statistics processing performed by the deriver when a storage configured to store an article is mounted in a moving body and a delivery of the article is performed.

7 Claims, 29 Drawing Sheets

(51) Int. Cl.
*F25D 11/00* (2006.01)
*G06F 17/18* (2006.01)
(52) U.S. Cl.
CPC ..... *G06Q 10/0833* (2013.01); *F25D 2700/12* (2013.01); *F25D 2700/16* (2013.01); *G06F 17/18* (2013.01)

(56) References Cited

U.S. PATENT DOCUMENTS

| | | | |
|---|---|---|---|
| 2015/0121919 A1* | 5/2015 | Lee | F25B 1/005 62/115 |
| 2016/0025365 A1* | 1/2016 | Moudy | G07F 17/12 700/276 |
| 2016/0116061 A1* | 4/2016 | Ammler | F16H 61/0031 701/51 |
| 2016/0196527 A1* | 7/2016 | Bose | G06Q 10/067 705/332 |
| 2016/0260059 A1* | 9/2016 | Benjamin | H04W 4/027 |

FOREIGN PATENT DOCUMENTS

| | | |
|---|---|---|
| JP | 6004584 B2 | 10/2016 |
| JP | 2017-24615 A | 2/2017 |
| JP | 2018-116482 A | 7/2018 |

* cited by examiner

FIG. 3

64A LOCATION DATA (TRANSPORT AND DELIVERY BUSINESS INFORMATION)

| DELIVERY BASE ID | NAME OF DELIVERY | LOCATION | POSITIONAL INFORMATION | | |
|---|---|---|---|---|---|
| | | | LATITUDE | LATITUDE CODE | LONGITUDE | LONGITUDE CODE |
| D01-000 | MINATO CENTER | MINATO DISTRICT, TOKYO | 3565.8580 | N | 13974.5433 | E |

| DELIVERY DESTINATION ID | NAME OF DELIVERY DESTINATION | LOCATION | POSITIONAL INFORMATION | | |
|---|---|---|---|---|---|
| | | | LATITUDE | LATITUDE CODE | LONGITUDE | LONGITUDE CODE |
| D01-001 | STORE A | CHIYODA DISTRICT, TOKYO | 3567.5888 | N | 13974.4858 | E |

64C BUSINESS REPORT INFORMATION
(TRANSPORT AND DELIVERY BUSINESS INFORMATION)

| VEHICLE ID | TRANSPORT AND DELIVERY MANAGEMENT ID | TYPE OF BUSINESS REPORT INFORAMTION | BUSINESS REPORT TIME |
|---|---|---|---|
| C1T002 | 17A28001 | DELIVERY DESTINATION ARRIVAL | 2017/10/28 7:21 |

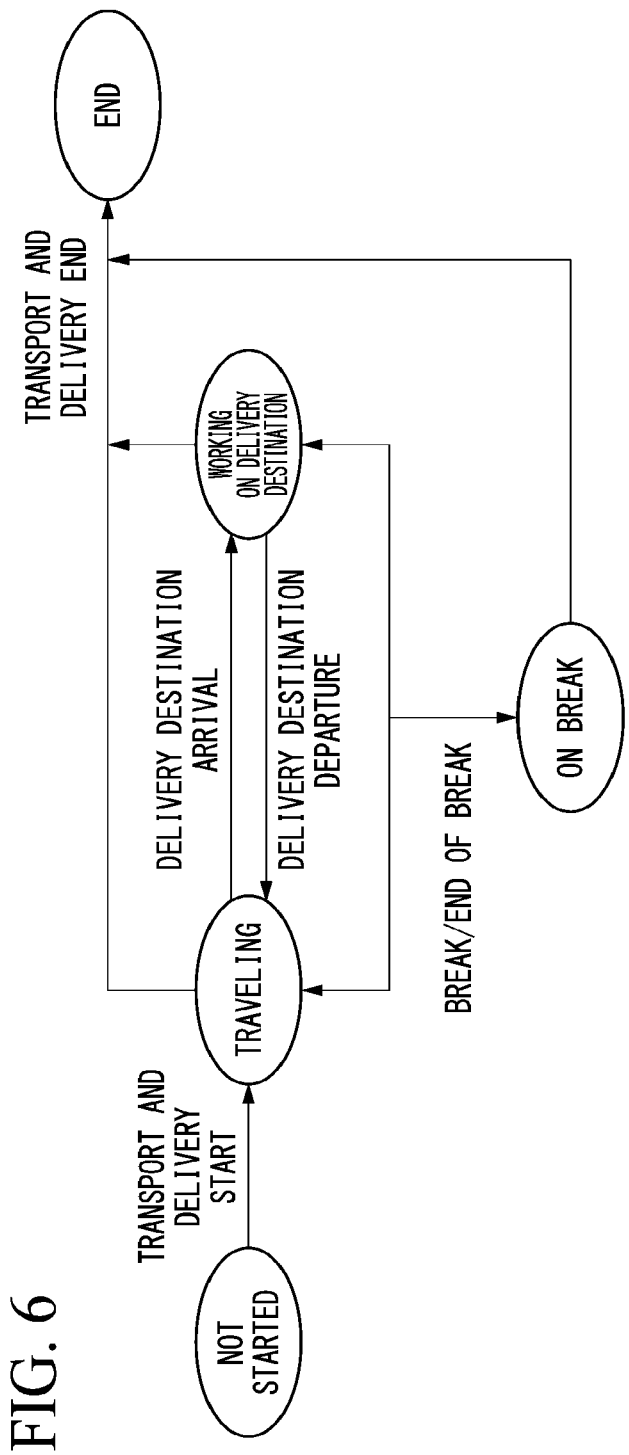

FIG. 7

66 TRANSPORT AND DELIVERY BUSINESS MESSAGE

| TRANSPORT AND DELIVERY MANAGEMENT ID | VEHICLE ID | STATUS BEFORE UPDATE | CURRENT STATUS | WRITTEN INFORMATION ||||||| NEXT SCHEDULED DELIVERY DESTINATION ID |
| --- | --- | --- | --- | --- | --- | --- | --- | --- | --- | --- |
| | | | | TRANSPORT AND DELIVERY START TIME | DELIVERY DESTINATION ID | DELIVERY DESTINATION ARRIVAL TIME | DELIVERY DESTINATION DEPARTURE TIME | BREAK START TIME | BREAK END TIME | DELIVERY END TIME | |
| 17A28001 | C1T002 | NOT STARTED | TRAVELING | 6:45 | - | - | - | - | - | - | D01-001 |

FIG. 8

72A SENSOR DATA
  (TRANSPORT AND DELIVERY ENVIRONMENTAL INFORMATION)

| COLD STORAGE UNIT ID | COLLECTED DATA |
|---|---|
| CB-0001 | (CHRONOLOGICAL DATA SUCH AS TEMPERATURE, HUMIDITY, IMPACT) |
| CB-0002 | (CHRONOLOGICAL DATA SUCH AS TEMPERATURE, HUMIDITY, IMPACT) |
| CB-0003 | (CHRONOLOGICAL DATA SUCH AS TEMPERATURE, HUMIDITY, IMPACT) |

FIG. 9

72B POSITIONING INFORMATION
  (TRANSPORT AND DELIVERY ENVIRONMENTAL INFORMATION)

| POSITIONING DEVICE ID | COLLECTED DATA |
|---|---|
| PD5678 | (POSITIONAL INFORMATION CHRONOLOGICAL DATA) |

FIG. 10

72C DOOR SENSOR INFORMATION
(TRANSPORT AND DELIVERY ENVIRONMENTAL INFORMATION)

| VEHICLE ID | COLLECTED DATA |
|---|---|
| C1T002 | (DOOR OPENING AND CLOSING CHRONOLOGICAL DATA) |

FIG. 11

84  TRANSPORT AND DELIVERY QUALITY MANAGEMENT RULE INFORMATION

| DELIVERY BASE ID | TEMPERATURE ZONE | THRESHOLD VALUE OF TEMPERATURE RISE RANGE DURING STAY AT DELIVERY DESTINATION | TEMPERATURE | | HUMIDITY | | IMPACT |
|---|---|---|---|---|---|---|---|
| | | | UPPER LIMIT | LOWER LIMIT | UPPER LIMIT | LOWER LIMIT | UPPER LIMIT |
| D01-000 | FREEZING | 20°C | 0 DEGREES | -25°C | Null | Null | Null |
| D01-000 | REFRIGER-ATION | 15°C | 8°C | 2°C | Null | Null | Null |
| D01-000 | CONSTANT TEMPERATURE | 10°C | 15°C | 5°C | Null | Null | Null |

FIG. 13

85  ACCUMULATION DATA REGARDING TRANSPORT AND DELIVERY QUALITY

| DELIVERY DESTINATION ID | DELIVERY BASE ID | TRANSPORT AND DELIVERY DATE (TRANSPORT AND DELIVERY START TIME) | STAY TIME (MINUTES) | TEMPERATURE ZONE DIVISION | TEMPERATURE RISE DURING STAY (°C) | MAXIMUM TEMPERATURE DURING STAY (°C) | MANAGEMENT RULE DEVIATION OCCURRENCE (HIGH TEMPERATURE SIDE) (Yes/No) |
|---|---|---|---|---|---|---|---|

FIG. 15

88A AVERAGE DATA OF ACTUAL RESULT FROM PREVIOUS MONTH (TRANSPORT AND DELIVERY QUALITY ACCUMULATION DATA)

| DELIVERY DESTINATION ID | DELIVERY BASE ID | TRANSPORT AND DELIVERY IMPLEMENTATION MONTH | AVERAGE STAY TIME (MINUTES) | TEMPERATURE ZONE DIVISION | AVERAGE TEMPERATURE RISE DURING STAY (°C) | AVERAGE OF MAXIMUM TEMPERATURE DURING STAY (°C) | OCCURRENCE FREQUENCY (TIMES/TIMES) OF MANAGEMENT RULE DEVIATION (HIGH TEMPERATURE SIDE) |
|---|---|---|---|---|---|---|---|

92A BUSINESS CONDITION FOR IMPLEMENTING
MANAGEMENT RULE DEVIATION PREVENTION MEASURE
(DEVIATION PREVENTION MEASURE INFORAMATION)

| CONDITION 1 | STATUS=TRAVELING |
| CONDITION 2 | STATUS=TAKING BREAK |

LOGICAL EXPRESSION: CONDITION 1 OR CONDITION 2

FIG. 19

<u>92B</u> TRANSPORT QUALITY CONDITION FOR IMPLEMENTING
MANAGEMENT RULE PREVENTION MEASURE
(DEVIATION PREVENTION MEASURE INFORMATION)

| TEMPERATURE ZONE DIVISION | TRANSPORT QUALITY CONDITION FOR IMPLEMENTING DEVIATION PREVENTION MEASURE | | |
|---|---|---|---|
| FREEZING | CONDITION 1 | AVERAGE TEMPERATURE RISE | 20°C OR ABOVE |
| | CONDITION 2 | TEMPERATURE RULE DEVIATION OCCURRENCE FREQUENCY | 1/30 OR ABOVE |
| | LOGICAL EXPRESSION | CONDITION 1 AND CONDITION 2 | |
| REFRIGERATION | CONDITION 1 | AVERAGE TEMPERATURE RISE | 15°C OR ABOVE |
| | CONDITION 2 | TEMPERATURE RULE DEVIATION OCCURRENCE FREQUENCY | 1/30 OR ABOVE |
| | LOGICAL EXPRESSION | CONDITION 1 AND CONDITION 2 | |
| CONSTANT TEMPERATURE | CONDITION 1 | AVERAGE TEMPERATURE RISE | 10°C OR ABOVE |
| | CONDITION 2 | TEMPERATURE RULE DEVIATION OCCURRENCE FREQUENCY | 1/30 OR ABOVE |
| | LOGICAL EXPRESSION | CONDITION 1 AND CONDITION 2 | |

FIG. 20

92C DEVIATION PREVENTION MEASURE INSTRUCTION DATA
(DEVIATION PREVENTION MEASURE INFORMATION)

| COLD STORAGE UNIT ID | TYPE OF COLD STORAGE UNIT | DEVIATION PREVENTION MEASURE INSTRUCTION CONTENT | | |
|---|---|---|---|---|
| | | TRIGGERING CONDITION | TEMPERATURE SETTING | CANCELLATION CONDITION |
| CB-0001 | COLD STORAGE UNIT A | CURRENT LOCATION IS WITHIN 10km FROM NEXT DELIVERY DESTINATION | REFERENCE -5°C | UNLOCKING |
| CB-0002 | COLD STORAGE UNIT A | CURRENT LOCATION IS WITHIN 10km FROM NEXT DELIVERY DESTINATION | REFERENCE -5°C | UNLOCKING |
| CB-0003 | COLD STORAGE UNIT B | CURRENT LOCATION IS WITHIN 5km FROM NEXT DELIVERY DESTINATION | REFERENCE -3°C | UNLOCKING |
| CB-0004 | COLD STORAGE UNIT B | CURRENT LOCATION IS WITHIN 5km FROM NEXT DELIVERY DESTINATION | REFERENCE -3°C | UNLOCKING |

FIG. 21

92D DEVIATION PREVENTION MEASURE INSTRUCTION DATA
(DEVIATION PREVENTION MEASURE INFORMATION)

| COLD STORAGE UNIT ID | TYPE OF COLD STORAGE UNIT | DEVIATION PREVENTION MEASURE INSTRUCTION CONTENT | | |
|---|---|---|---|---|
| | | TRIGGERING CONDITION | TEMPERATURE SETTING | CANCELLATION CONDITION |
| CB-0001 | COLD STORAGE UNIT A | PREDICTED TIME IS WITHIN 30 MINUTES BEFORE ARRIVAL | REFERENCE -5°C | UNLOCKING |
| CB-0002 | COLD STORAGE UNIT A | PREDICTED TIME IS WITHIN 30 MINUTES BEFORE ARRIVAL | REFERENCE -5°C | UNLOCKING |
| CB-0003 | COLD STORAGE UNIT B | PREDICTED TIME IS WITHIN 15 MINUTES BEFORE ARRIVAL | REFERENCE -3°C | UNLOCKING |
| CB-0004 | COLD STORAGE UNIT B | PREDICTED TIME IS WITHIN 15 MINUTES BEFORE ARRIVAL | REFERENCE -3°C | UNLOCKING |

FIG. 27

92B TRANSPORT QUALITY CONDITION FOR IMPLEMENTING
MANAGEMENT RULE DEVIATION PREVENTION MEASURE
(DEVIATION PREVENTION MEASURE INFORMATION)

| TEMPERATURE ZONE DIVISION | TRANSPORT QUALITY CONDITION FOR IMPLEMENTING DEVIATION PREVENTION MEASURE | | |
|---|---|---|---|
| FREEZING | CONDITION 1 | PREDICTED TEMPERATURE RISE | 20°C OR ABOVE |
| | CONDITION 2 | TEMPERATURE RULE DEVIATION OCCURRENCE PROBABILITY | 1/30 OR ABOVE |
| | LOGICAL EXPRESSION | CONDITION 1 AND CONDITION 2 | |
| REFRIGERATION | CONDITION 1 | PREDICTED TEMPERATURE RISE | 15°C OR ABOVE |
| | CONDITION 2 | TEMPERATURE RULE DEVIATION OCCURRENCE PROBABILITY | 1/30 OR ABOVE |
| | LOGICAL EXPRESSION | CONDITION 1 AND CONDITION 2 | |
| CONSTANT TEMPERATURE | CONDITION 1 | PREDICTED TEMPERATURE RISE | 10°C OR ABOVE |
| | CONDITION 2 | TEMPERATURE RULE DEVIATION OCCURRENCE PROBABILITY | 1/30 OR ABOVE |
| | LOGICAL EXPRESSION | CONDITION 1 AND CONDITION 2 | |

FIG. 32

102 REFERENCE COLD STORAGE UNIT TEMPERATURE SETTING DATA

| COLD STORAGE UNIT ID | TYPE OF COLD STORAGE UNIT | REFERENCE TEMPERATURE SETTING |
|---|---|---|
| CB-0001 | COLD STORAGE UNIT A | -18°C |
| CB-0002 | COLD STORAGE UNIT A | 4°C |
| CB-0003 | COLD STORAGE UNIT B | -18°C |
| CB-0004 | COLD STORAGE UNIT B | 4°C |

FIG. 33

104 WEATHER INFORMATION OF DELIVERY DESTINATION AREA

| MONTH | DAILY AVERAGE OUTSIDE AIR TEMPERATURE |
|---|---|
| MAY | 25°C |
| JUNE | 28°C |
| JULY | 30°C |
| AUGUST | 31°C |

FIG. 34

106 COLD STORAGE UNIT A COLD STORAGE UNIT POWER CONSUMPTION TABLE

| SET TEMPERATURE / OUTSIDE AIR TEMPERATURE | -28°C | -23°C | -21°C | -18°C |
|---|---|---|---|---|
| 35°C | 75W | 75W | 75W | 73W |
| 25°C | 73W | 68W | 66W | 63W |
| 15°C | 63W | 58W | 56W | 53W |
| 5°C | 53W | 48W | 46W | 43W |

LOGISTICS SUPPORT DEVICE, LOGISTICS SUPPORT METHOD, AND STORAGE MEDIUM

TECHNICAL FIELD

Embodiments of the present invention relates to a logistics support device, a logistics support method, and a program.

BACKGROUND ART

At a site at which an article is delivered, a temperature in a cold storage unit of a truck may rise when unloading work at a delivery destination is performed. As a countermeasure against this, workers can limit the rise in temperature in a cold storage unit by artificial means such as spraying dry ice at the time of starting unloading work at a delivery destination, but this increases a work load.

CITATION LIST

Patent Literature

[Patent Document 1]
Japanese Unexamined Patent Application, First Publication No. 2002-71253

SUMMARY OF INVENTION

Technical Problem

An object of the present invention is to provide a logistics support device, a logistics support method, and a program which can support an environment in storage such that it does not deviate from a management rule.

Solution to Problem

A logistics support device of embodiments includes a deriver and an instruction controller. The deriver performs, when a storage configured to store an article is mounted in a moving body and stays in a work place at which work is performed on an article stored in the storage in a delivery business, statistics processing on environmental information on an environmental change inside the storage. The instruction controller outputs an instruction on the basis of a result of the statistics processing performed by the deriver when a storage configured to store an article is mounted in a moving body and delivery of the article is performed.

BRIEF DESCRIPTION OF DRAWINGS

FIG. 3 is a diagram which shows an example of location data 64A.

FIG. 5 is a diagram which shows an example of business report information 64C.

FIG. 6 is a diagram showing "statuses" managed in the transport and delivery management data 64B.

FIG. 7 is a diagram which shows an example of a transport and delivery business message 66.

FIG. 8 is a diagram which shows an example of sensor data 72A.

FIG. 9 is a diagram which shows an example of positioning information 72B.

FIG. 10 is a diagram which shows an example of door sensor information 72C.

FIG. 11 is a diagram which shows an example of transport and delivery quality management rule information 84.

FIG. 13 is a diagram which shows an example of accumulation data 85 regarding transport and delivery quality.

FIG. 15 is a diagram which shows an example of average data 88A of actual results from a previous month.

FIG. 19 is a diagram which shows an example of a transport quality condition 92B for implementing a management rule prevention measure.

FIG. 20 is a diagram which shows an example of deviation prevention measure instruction data 92C.

FIG. 21 is a diagram which shows another example of deviation prevention measure instruction data 92D.

FIG. 27 is a diagram which shows an example of the transport quality condition 92B for implementing a management rule prevention measure of the second embodiment.

FIG. 32 is a diagram which shows an example of reference cold storage unit temperature setting data 102.

FIG. 33 is a diagram which shows an example of local delivery destination weather information 104.

FIG. 34 is a diagram which shows an example of a cold storage unit power consumption table 106.

DESCRIPTION OF EMBODIMENTS

Hereinafter, a logistics support device, a logistics support method, and a program of embodiments will be described with reference to the drawings. In the logistics support system including a logistics support device, the logistics support method, and the program of the present embodiment, an example using a cold storage (cold box) as a storage will be described, but the present invention is not limited thereto, and a storage which is maintained such that the internal environment of the storage is different from the external environment, such as a temperature keeping storage or a humidity keeping storage, may also be applied. That is, the environment may include various things such as temperature, humidity, and pressure. In the present embodiment, the storage is described as being mounted in a car, but it may be transported by a moving body such as a ship or an aircraft.

First Embodiment

Figure 1:
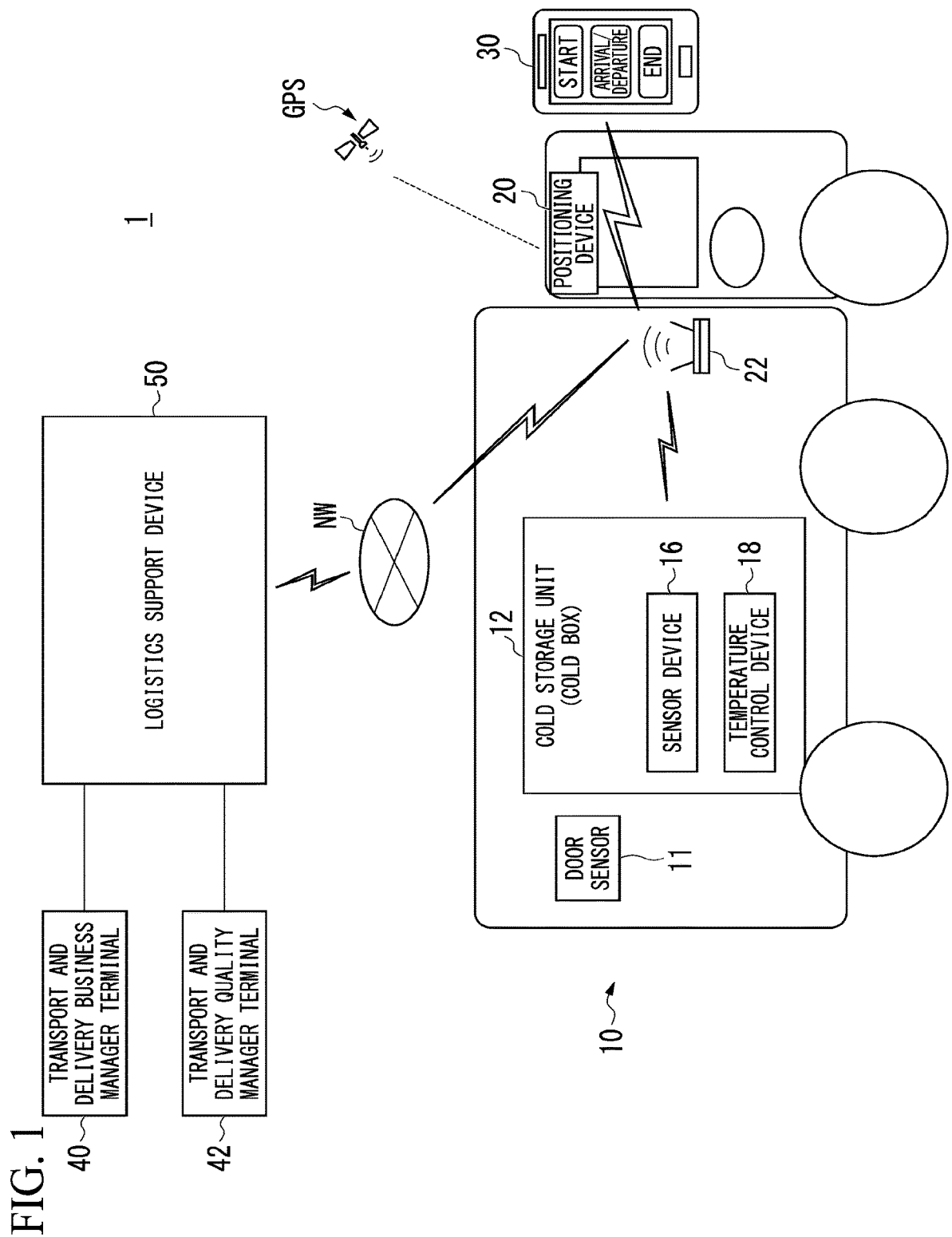
FIG. 1 is a diagram showing a configuration of a logistics support system 1.

FIG. 1 is a diagram showing a configuration of a logistics support system 1. The logistics support system 1 includes, for example, a transport vehicle 10, a terminal device 30, a transport and delivery business manager terminal 40, a transport and delivery quality manager terminal 42, and a logistics support device 50. The transport vehicle 10, the transport and delivery business manager terminal 40, the transport and delivery quality manager terminal 42, and the logistics support device 50 communicate with each other via a network NW such as a local area network (LAN), a wide area network (WAN), a mobile phone network, a Wi-H network, a dedicated line, or the Internet.

[Transport Vehicle]

The transport vehicle 10 includes, for example, a door sensor 11, a cold storage unit 12, a positioning device 20, and a communication device 22. The door sensor 11 is a sensor which detects opening or closing of a door of the transport vehicle 10. The cold storage unit 12 includes, for example, a sensor device 16 and a temperature control device 18. The temperature control device 18 is an example of an "environment controller." A sensor device may be attached to a package stored in the cold storage unit.

The sensor device 16 is, for example, a sensor which detects a temperature, humidity, or the like of the inside of the cold storage unit 12, or an impact detection sensor which detects an impact (acceleration). The door sensor 11 and the sensor device 16 transmit a detection result to the logistics support device 50 via the network NW. The door sensor 11 and the sensor device 16 may communicate with a communication device 22 to be described below, and transmit a detection result to the logistics support device 50 via the network NW through the communication device 22.

The temperature control device 18 controls a heat exchange system which adjusts the temperature inside the cold storage unit 12 to set the temperature, humidity, and the like inside the cold storage unit to those of a desired environment.

The positioning device 20 includes a GPS antenna and a positioner. The GPS antenna receives radio waves superimposed with positioning information from a plurality of GPS satellites. The positioner specifies a position of a host device by performing a positioning operation on the basis of radio waves superimposed with information received by the GPS antenna.

The communication device 22 communicates with the cold storage unit 12, the positioning device 20, and the terminal device 30. The communication device 22 transmits the information acquired through the communication to the logistics support device 50 via the network NW using wireless communication. The communication device 22 may also communicate with the sensor device 16 and transmit data acquired using the door sensor 11 or the sensor device 16 to the logistics support device 50 via the network NW. The communication device 22 may thin out data transmission with respect to the logistics support device 50 or change a transmission frequency according to a communication status with the cold storage unit 12, the positioning device 20, the terminal device 30, the door sensor 11, the sensor device 16, and the network NW, environmental data in the cold storage unit received from the sensor device 16, positional information received from the positioning device 20, a remaining battery capacity when the communication device 22 operates with a battery, and the like.

The terminal device 30 is, for example, a terminal device such as a smart phone or a tablet terminal used by a driver of the transport vehicle 10. The terminal device 30 includes an operation button for receiving an operation performed by the driver, and executes various types of processing in accordance with an operation when the operation performed by the driver on the operation button is received. The terminal device 30 may include, for example, a communication interface (not shown), and transmit a processing result to the logistics support device 50 by accessing the network NW according to communication, or may transmit the processing result to the logistics support device 50 via the communication device 22.

The transport and delivery business manager terminal 40 is, for example, a terminal which manages a transport and delivery business in the logistics support system 1. The transport and delivery quality manager terminal 42 is, for example, a terminal which manages quality of a transported or delivered article in the logistics support system 1.

[Logistics Support Device]

Figure 2:
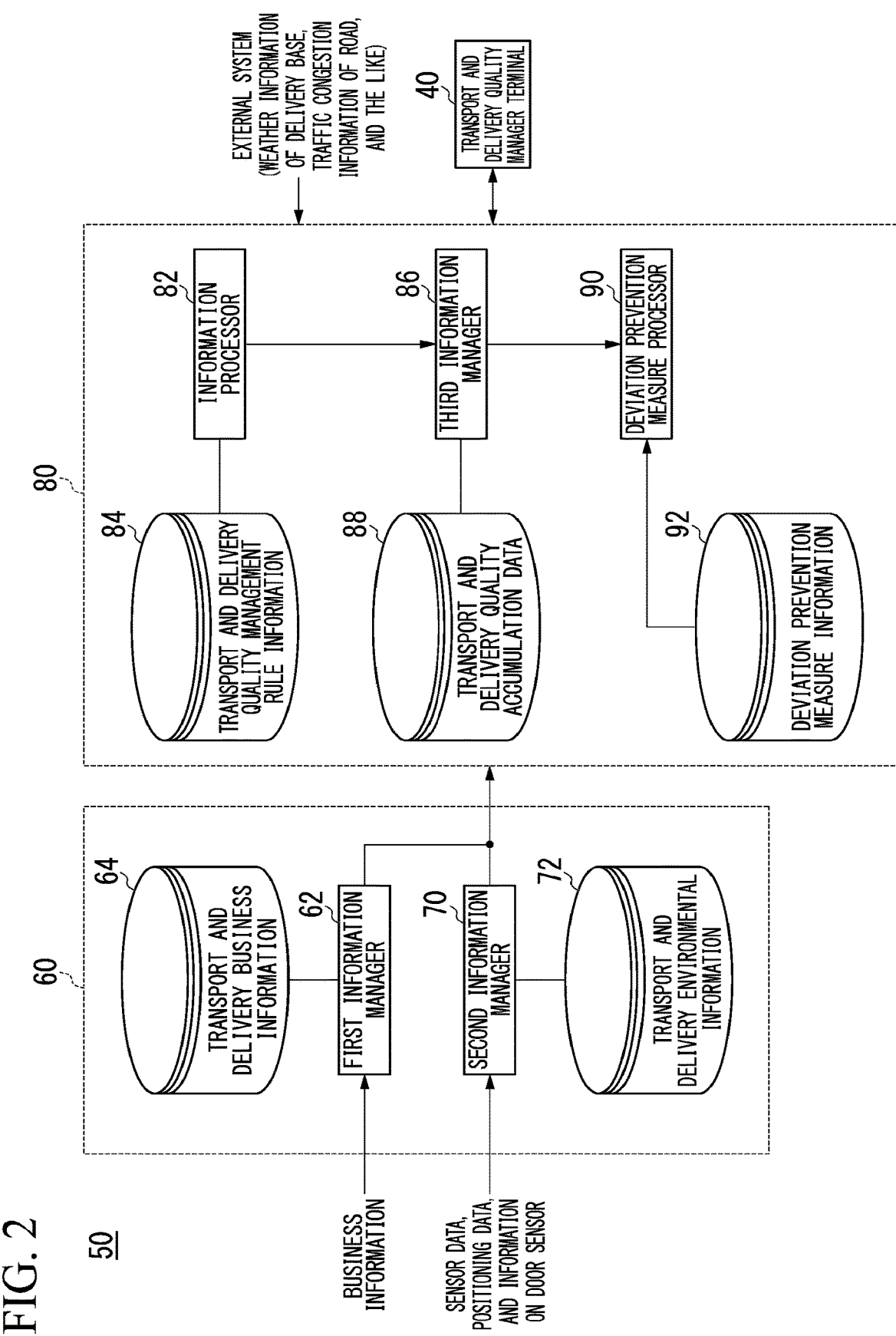
FIG. 2 is a diagram which shows a functional configuration of a logistics support device 50.

FIG. 2 is a diagram which shows a functional configuration of the logistics support device 50. The logistics support device 50 includes, for example, an information manager 60 and a supporter 80.

[Information Manager]

The information manager 60 includes, for example, a first information manager 62, transport and delivery business information 64, a second information manager 70, and transport and delivery environmental information 72. The first information manager 62 and the second information manager 70 are implemented by a processor such as a central processing unit (CPU) executing a program stored in a storage unit device provided in the logistics support device 50. All or some of these functional units may be implemented by hardware such as a large scale integration (LSI), an application specific integrated circuit (ASIC), or a field-programmable gate array (FPGA), and may have a circuit constituent for realizing functions of these functional units. These functional units may be implemented by software and hardware in cooperation. The transport and delivery business information 64 and the transport and delivery environmental information 72 are stored, for example, in a storage device realized by a non-volatile storage medium such as a read only memory (ROM), a flash memory, or a hard disk drive (HDD) and a volatile storage medium such as a random access memory (RAM) or a register.

The first information manager 62 manages the transport and delivery business information 64. The transport and delivery business information 64 includes, for example, location data 64A which indicates a location of a delivery base or a delivery destination, transport and delivery management data 64B which indicates content of a transport and delivery business, and business report information 64C which is transmitted from the driver of the transport vehicle 10. A delivery base is, for example, a place at which an article to be delivered is loaded into the transport vehicle 10 (or the cold storage unit 12 of the transport vehicle 10). At the delivery base, not only loading but also unloading of an article may be performed in some cases. A delivery destination is, for example, a place at which unloading of the article loaded into the transport vehicle 10 is performed. At a delivery destination, not only unloading but also loading of an article may be performed in some cases.

FIG. 3 is a diagram which shows an example of the location data 64A. The location data 64A is, for example, information in which a name of a delivery base, a location of a delivery base, and positional information of a delivery base are associated with a delivery base ID. The positional information of a delivery base includes latitude, a latitude code, longitude, and a longitude code. A name, a location, and positional information of a delivery destination are associated with a delivery destination ID. Data of the location data 64A is registered by the transport and delivery business manager terminal 40.

Figure 4:
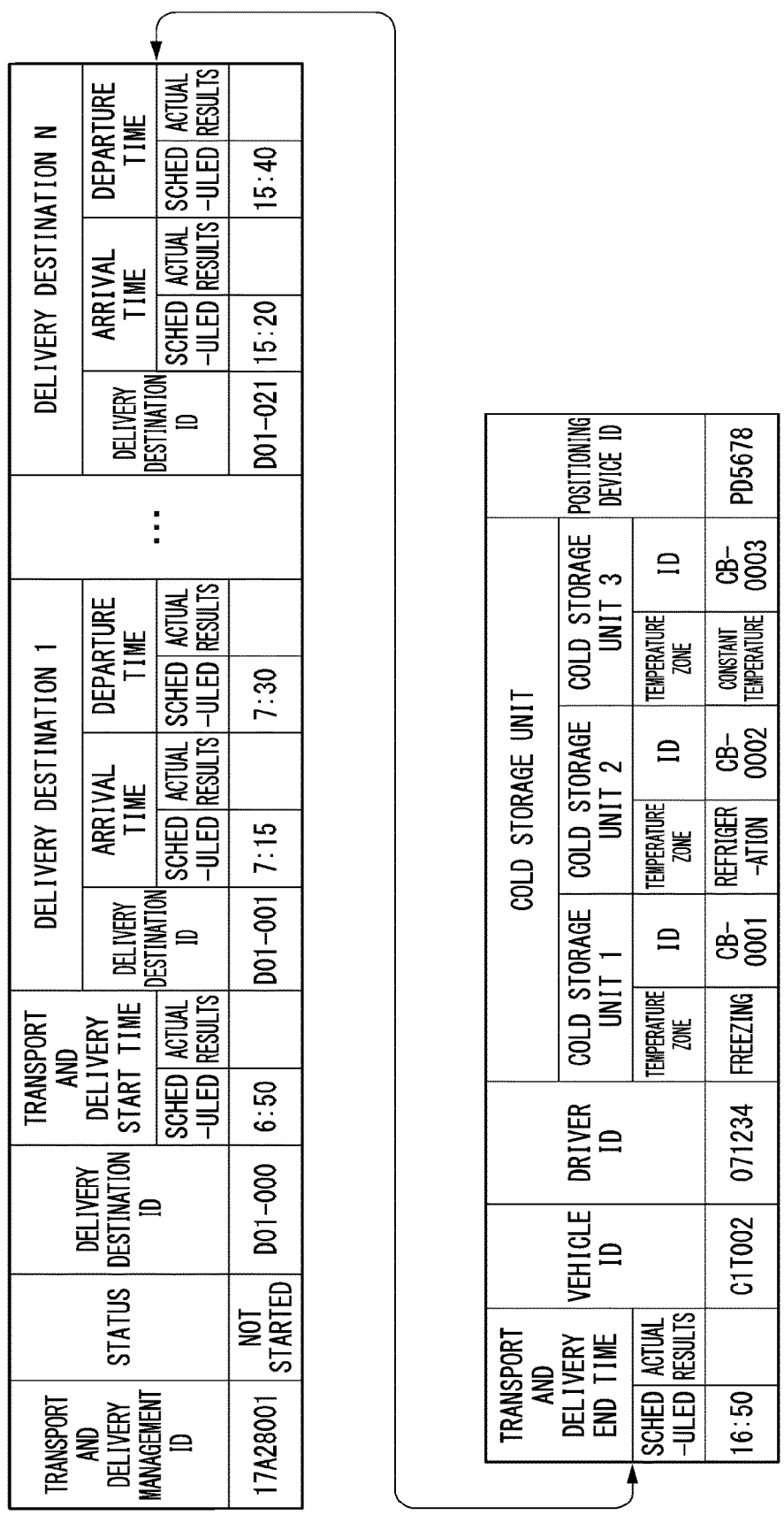
FIG. 4 is a diagram which shows an example of transport and delivery management data 64B.

FIG. 4 is a diagram which shows an example of the transport and delivery management data 64B. The transport and delivery management data 64B is information in which transport and delivery statuses (such as a start or end), delivery base IDs, transport and delivery start times (scheduled and actual results), information on delivery destinations 1 to N, transport and delivery end times (scheduled and actual results), vehicle IDs of transport vehicles 10, driver IDs of transport vehicles 10, information on a cold storage unit, and positioning device IDs of a positioning device 20 are associated with transport and delivery management IDs indicating a series of transport and delivery business. The information on delivery destinations 1 to N includes the delivery destination ID, arrival time (scheduled and actual results), and departure time (scheduled and actual results) of each delivery destination. The information on a cold storage unit is, for example, information indicating a cold storage unit ID and a temperature zone (freezing, refrigeration, or a constant temperature). Data other than the "status" and "actual results" of the transport and delivery management data 64B is registered by the transport and delivery business manager terminal 40. The "status" and "actual results" data of the transport and delivery management data 64B may be registered by the transport and delivery business manager terminal 40, and may also be registered, for example, in a method to be described below based on business report information 64C to be described below by the first information manager 62.

The business report information 64C is, for example, information indicating content of a transport and delivery business transmitted from the terminal device 30 carried by the driver of the transport vehicle 10, an in-vehicle device of the transport vehicle 10 (for example, a drive recorder having a communication function), or the like. For example, the driver operates an operation unit of the terminal device 30, and thereby the content of business report information is selected and the selected information is transmitted.

FIG. 5 is a diagram which shows an example of the business report information 64C. The business report information 64C is information in which a vehicle ID, a transport and delivery management ID, a type of business report information, and a business report time are associated with one another. The type of business report information is a type of transport and delivery business, and includes, for example, starting transport and delivery, arriving at a delivery destination, leaving a delivery destination, on a break, ending transport and delivery, and the like.

The first information manager 62 updates the "status" of a associating with "transport and delivery management ID" of the transport and delivery management data 64B on the basis of a status transition to be described below and writes "business report time" in the "actual results" on the basis of the business report information 64C, for example, if the business report information 64C transmitted by the terminal device 30 is acquired.

Here, the "status" and status transition managed in the transport and delivery management data 64B will be described with reference to FIG. 6. The "status" described above has the following types. A status in which transport and delivery of an article are not started is indicated as "not started," a status in which the transport vehicle 10 is traveling toward a delivery destination is indicated as "traveling," a status in which the transport vehicle 10 has arrived at a delivery destination is indicated as "delivery in progress at destination," a status in which the driver of the transport vehicle 10 takes a break is indicated as "on a break," and a status in which the transport and delivery of an article has ended is indicated as "completed."

The first information manager 62 generates a transport and delivery business message 66 that is information indicating a status transition and a time thereof immediately after the business report information 64C is reflected in the transport and delivery management data 64B, and transmits the generated transport and delivery business message 66 to a deviation prevention measure processor 90 of the supporter 80.

FIG. 7 is a diagram which shows an example of the transport and delivery business message 66. The transport and delivery business message 66 is information in which a vehicle ID, a pre-update state which is a "status" before a "status" update, a current status which is a "status" after the "status" update, information written for the transport and delivery management data 64B, and a next scheduled delivery destination ID are associated with a transport and delivery management ID. The written information is, for example, a transport and delivery start time, a delivery destination ID, a delivery destination arrival time, a delivery destination departure time, a break start time, a break end time, or a delivery end time, and is information to be written according to "actual results" of the transport and delivery management data 64B.

The second information manager 70 manages the transport and delivery environmental information 72. The transport and delivery environmental information 72 includes, for example, sensor data 72A that is information acquired by the sensor device 16, positioning information 72B that is information (positioning data) indicating a positioning result of the positioning device 20, and door sensor information 72C that is information indicating a detection result from the door sensor 11.

FIG. 8 is a diagram which shows an example of the sensor data 72A. The sensor data 72A is information in which information such as the temperature, humidity, or impact of the cold storage unit 12 is associated with a cold storage unit ID in chronological order. FIG. 9 is a diagram which shows an example of the positioning information 72B. The positioning information 72B is information in which the positional information of the positioning device 20 is associated with a positioning device ID in chronological order. FIG. 10 is a diagram which shows an example of the door sensor information 72C. The door sensor information 72C is information (door opening/closing data) in which information on door opening or closing is associated with a vehicle ID in chronological order. When a sensor device is attached to a package, a "package ID" may be used instead of a "cold storage unit ID."

[Supporter]

The supporter 80 includes, for example, an information processor 82, transport and delivery quality management rule information 84, a third information manager 86, transport and delivery quality accumulation data 88, a deviation prevention measure processor 90, and deviation prevention measure information 92. The third information manager 86 is an example of a "deriver." The deviation prevention measure processor 90 is an example of an "instruction controller." The transport and delivery quality management rule information 84 is an example of a "management rule of an article" which determines in what kind of environment to manage an article.

The information processor 82 acquires the transport and delivery business information 64 and the transport and delivery environmental information 72 from the first information manager 62 and the second information manager 70, respectively. The information processor 82 generates a transport and delivery quality business report according to processing to be described below and displays it on a display device of the logistics support device 50 or a display device of another terminal device on the basis of the acquired information (the transport and delivery business information 64 and the transport and delivery environmental information 72) and the transport and delivery quality management rule information 84.

The transport and delivery quality management rule information 84 is information which indicates a management rule at the time of transporting an article, which is determined for each transport and delivery management ID. FIG. 11 is a diagram which shows an example of the transport and delivery quality management rule information 84. The transport and delivery quality management rule information 84 is information in which the information indicating a temperature zone, a threshold value of a temperature range (temperature rise range) in a stay period of a delivery destination, upper and lower limits of the temperature, upper and lower limits of the humidity, and an upper limit of the impact are associated with a delivery base ID.

The information processor 82 regards time from the arrival time of each delivery destination to the departure time of each delivery destination as the stay time of each delivery destination, and specifies a temperature range of the inside of the cold storage unit 12 during the stay time by performing processing to cause the transport and delivery business information 64 and the transport and delivery environmental information 72 to match. Moreover, the information processor 82 refers to the transport and delivery quality management rule information 84 associated with a transport and delivery management ID, and determines a deviation of a management rule using conditional Equation (1) or Equation (2) as follows.

(1) A deviation condition (high temperature side) of the management rule={(a condition [A] in which a temperature rise range (temperature range) during a stay time at each delivery destination has exceeded a temperature rise threshold value) and (a condition [B] in which a maximum temperature during the stay time at each delivery destination has exceeded a temperature upper limit threshold value)}, (2) A deviation condition (low temperature side) of the management rule=(a condition [C] in which a minimum temperature during time between a delivery start time and a delivery end time has fallen below a temperature lower limit threshold value) A reason for combining the condition [A] and the condition [B] is to exclude false detections caused by constantly satisfying the condition [B] when the sensor device 16 is forgotten.

Figure 12:
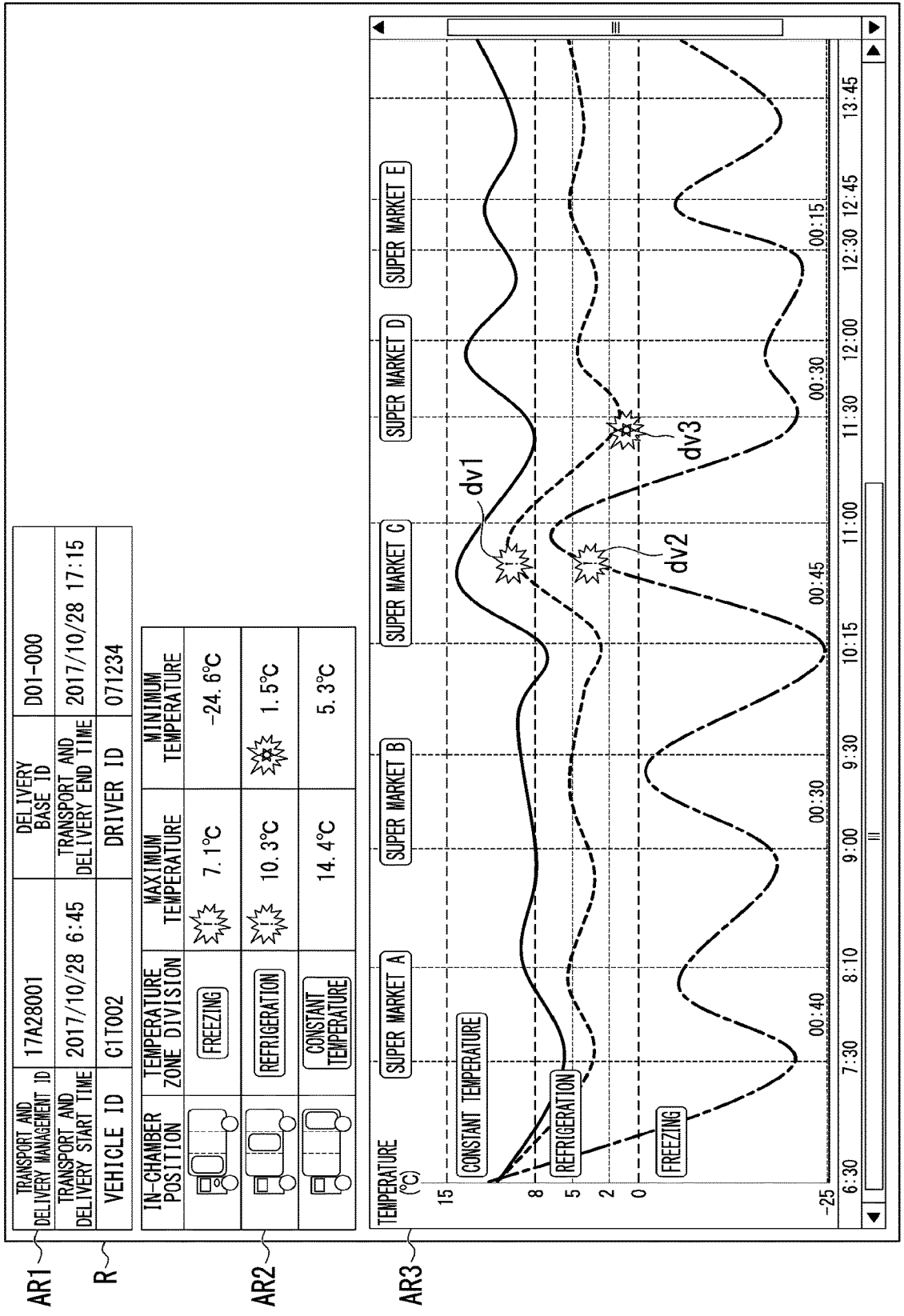
FIG. 12 is a diagram which shows an example of a transport and delivery quality business report R.

FIG. 12 is a diagram which shows an example of the transport and delivery quality business report R. The transport and delivery quality business report R includes information in which an environment of the cold storage unit 12 is shown in chronological order and information indicating whether the environment of the cold storage unit 12 deviates from a management rule designated in the transport and delivery quality management rule information 84. More specifically, the transport and delivery quality business report R includes, as shown in an area AR1 in FIG. 12, a transport and delivery management ID, a delivery base ID, a transport and delivery start time, a transport and delivery end time, a vehicle ID, and a driver ID.

In FIG. 12, an area AR2 includes a position (in-chamber position) of a cold storage unit in the transport vehicle 10, a temperature zone division, a maximum temperature, a minimum temperature, and the like detected by the sensor device 16. In the example shown, the position of a cold storage unit in which the temperature zone division is freezing is a front of the transport vehicle 10, the position of a cold storage unit in which the temperature zone division is a constant temperature is a back of the transport vehicle 10, and the position of a cold storage unit in which the temperature zone division is refrigeration is positioned between the front and the back of the transport vehicle 10.

In FIG. 12, in an area AR3, a graph is drawn in which the vertical axis indicates a temperature and the horizontal axis indicates time, and temperatures of each cold storage unit are associated in time series. In the graph of the area AR3, stay times at each delivery destination (for example, super markets A to E) are associated. The stay time at a delivery destination is time between a time of arrival at the delivery destination and a time of departure from the delivery destination. Moreover, an upper limit temperature and a lower limit temperature for each temperature zone division are associated with the area AR3, and when a temperature deviates the upper limit temperature or the lower limit temperature for the temperature zone division, information indicating the deviation (dv1 to dv3 in FIG. 2) is associated with the area AR3.

Furthermore, the information processor 82 outputs accumulation data 85 regarding transport and delivery quality to the third information manager 86 through the processing described above. FIG. 13 is a diagram which shows an example of the accumulation data 85 regarding transport and delivery quality. The accumulation data 85 regarding transport and delivery quality is information in which a delivery base ID, a transport and delivery date (a transport and delivery start time), a stay time (minutes) at a delivery destination, a temperature zone division, a temperature rise during a stay (° C.), a maximum temperature during a stay (° C.), and presence or absence of occurrence of deviation of a management rule are associated with a delivery destination ID. The information on the presence or absence of occurrence of deviation of a management rule in the example shown may include only a high temperature side, or may also include a low temperature side in the same manner.

The third information manager 86 performs statistics processing on environmental information regarding an environmental change inside the cold storage unit 12 when the cold storage unit 12 that stores an article is mounted in a moving body (a transport vehicle 10) and stays at a work place (for example, a delivery destination) at which work is performed on the article stored in the cold storage unit 12 in a delivery business. In the delivery business, the work place at which work is performed on the article stored in the cold storage unit 12 is a place at which the door of the transport vehicle 10 (or the door of the cold storage unit 12) is opened, outside air flows into the cold storage unit 12, and thus an environment inside the cold storage unit 12 can change. More specifically, the work place described above is, for example, a delivery base at which loading of an article is performed, a delivery destination at which unloading of the article is performed, or a place at which the door of the transport vehicle 10 is opened, and an inspection or the like of an article (in the cold storage unit 12) is performed. A stay time is, for example, an arbitrarily determined period such as a period from an arrival of the transport vehicle 10 at a delivery destination to a departure thereof from the delivery destination, a period from a predetermined time elapse after an arrival to a departure, or a period from an arrival to predetermined time before a departure.

For example, the third information manager 86 accumulates and manages the accumulation data 85 regarding transport and delivery quality acquired from the information processor 82 as the transport and delivery quality accumulation data 88 in a storage unit device of the logistics support device 50. For example, the third information manager 86 performs statistics processing on the transport and delivery quality accumulation data 88 at preset intervals, and furthermore accumulates actual results of the statistics processing in the storage unit device of the logistics support device 50.

Figure 14:
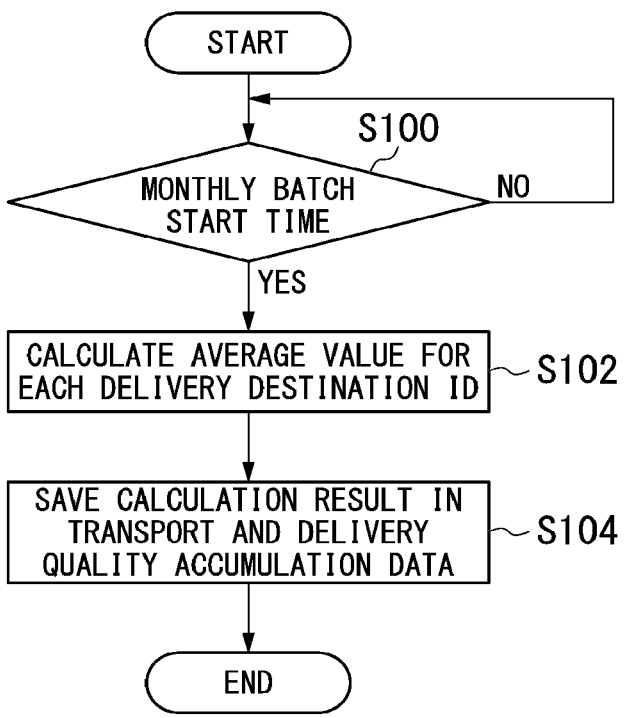
FIG. 14 is a flowchart which shows a flow of processing to be executed by a third information manager 86.

FIG. 14 is a flowchart which shows a flow of processing to be executed by the third information manager 86. First, the third information manager 86 waits until a time to start a monthly batch (step S100). If it is a time to start a monthly batch, the third information manager 86 calculates an average value of stay time, the average value of temperature rises, the average value of maximum temperatures, the deviation occurrence frequency of a management rule, and the like for each delivery destination ID using the transport and delivery quality accumulation data 88 accumulated in the storage unit device of the logistics support device 50 (step S102). In monthly batch processing, average data 88A of actual results from a previous month for each delivery destination ID as shown in FIG. 15 is obtained from the transport and delivery quality accumulation data 88.

FIG. 15 is a diagram which shows an example of the average data 88A of actual results from a previous month. The average data 88A of actual results from a previous month is information in which a delivery base ID, a transport and delivery implementation month, average stay time at a delivery destination, a temperature zone division, an average temperature rise during a stay (° C.), an average of maximum temperatures during a stay (° C.), and an occurrence frequency of the deviation of a management rule are associated with a delivery destination ID.

Next, the third information manager 86 saves a calculation result as the transport and delivery quality accumulation data 88 (step S104). As a result, processing of one routine of the present flowchart ends.

In statistics processing of the transport and delivery quality accumulation data 88 performed by the third information manager 86, a moving average may be calculated based on a recent constant amount of accumulation data 85, for example, whenever the accumulation data 85 regarding a determined amount of new transport and delivery quality is received from the information processor 82 and accumulated instead of a monthly batch.

The deviation prevention measure processor 90 outputs an instruction on the basis of a result of the statistics processing performed by the third information manager 86 when the cold storage unit 12 that stores an article is mounted in a moving body and a delivery of the article is performed. An instruction output by the deviation prevention measure processor 90 is, for example, an instruction for limiting a deviation of a management rule of an article specified in the transport and delivery quality management rule information 84. For example, the deviation prevention measure processor 90 output the instruction described above when it is detected that the transport vehicle 10 with the cold storage unit 12 mounted thereon approaches a delivery destination before an arrival at the delivery destination. The instruction for limiting a deviation may be an instruction for limiting a deviation of a management rule of an article set separately from the management rule of an article included in the transport and delivery quality management rule information 84. The management rule of an article set differently is, for example, a management rule for a management in an environment more suitable for the article (an environment that does not degrade the article) as compared to the management rule of an article included in the transport and delivery quality management rule information 84.

The deviation prevention measure information 92 includes, for example, a business condition 92A for implementing a management rule deviation prevention measure, a transport quality condition 92B for implementing a management rule prevention measure, and deviation prevention measure instruction data 92C. Details of these types of information will be described in detail below.

Figures 16, 17:
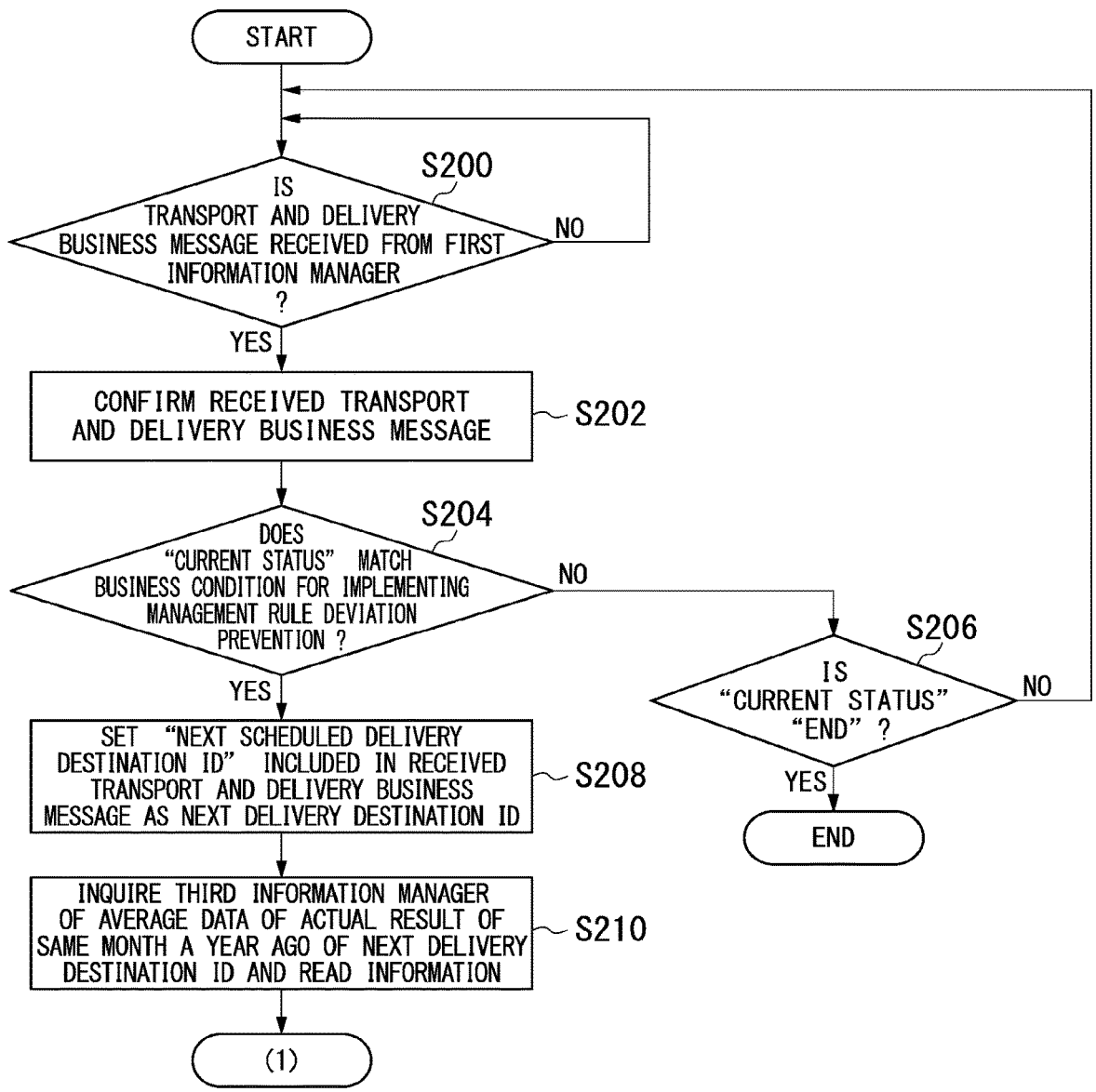
FIG. 16 is a flowchart (1) which shows a flow of processing to be executed by a deviation prevention measure processor 90.
FIG. 17 is a diagram which shows an example of a business condition 92A for implementing a management rule deviation prevention measure.

FIG. 16 is a flowchart (1) which shows a flow of processing to be executed by a deviation prevention measure processor 90. First, the deviation prevention measure processor 90 waits until the transport and delivery business message 66 is received from the first information manager 62 (step S200). If the transport and delivery business message 66 is received, the deviation prevention measure processor 90 confirms the received transport and delivery business message 66 (step S202). Next, the deviation prevention measure processor 90 determines whether a "current status" of the transport and delivery business message 66 matches the business condition 92A for implementing a management rule deviation prevention measure (step S204).

FIG. 17 is a diagram which shows an example of the business condition 92A for implementing a management rule deviation prevention measure. In the business condition 92A for implementing a management rule deviation prevention, a condition and a logical expression when a management deviation is prevented are specified. The logical expression is "Condition [1] or Condition [2]." Condition 1 is "status 32 traveling," and Condition [2] is "status=on a break."

When the "current status" of the transport and delivery business message 66 does not match the business condition 92A for implementing a management rule deviation prevention measure, the deviation prevention measure processor 90 determines whether the "current status" of the transport and delivery business message 66 is "completed" (step S206). When the "current status" of the transport and delivery business message is not "end," the procedure returns to the processing of step S200, and, when the "current status" of the transport and delivery business message is "end," the processing of the present flowchart ends.

When the "current status" of the transport and delivery business message matches the business condition 92A for implementing a management rule deviation prevention measure, the deviation prevention measure processor 90 sets a "next scheduled delivery destination ID" included in the received transport and delivery business message 66 as a next delivery destination ID (step S208). The "current status" is an example of "information indicating a delivery work status." For example, when the current status is traveling or taking a break, it is considered to be approaching a next delivery destination.

The deviation prevention measure processor 90 may inquire the first information manager 62 of a delivery destination ID of the delivery destination closest to the latest positioning data of the transport vehicle 10, specify the delivery destination ID from the location data 64A, and set a specified delivery destination ID as a "next delivery destination ID." For example, although a next delivery destination is set in the transport and delivery management data 64B, there is a route (a route corresponding to a transport and delivery management ID) in which a change in a next delivery destination is permitted depending on a traffic condition or a driver preference. For a route of such transport and delivery management ID, it is preferable to set a delivery destination closest to the latest positioning data as a next delivery destination.

Next, the deviation prevention measure processor 90 inquires the third information manager 86 of average data of actual results of the same month a year ago of the next delivery destination ID, and reads information on a response to the inquiry from the third information manager 86 (step S210).

Figure 18:
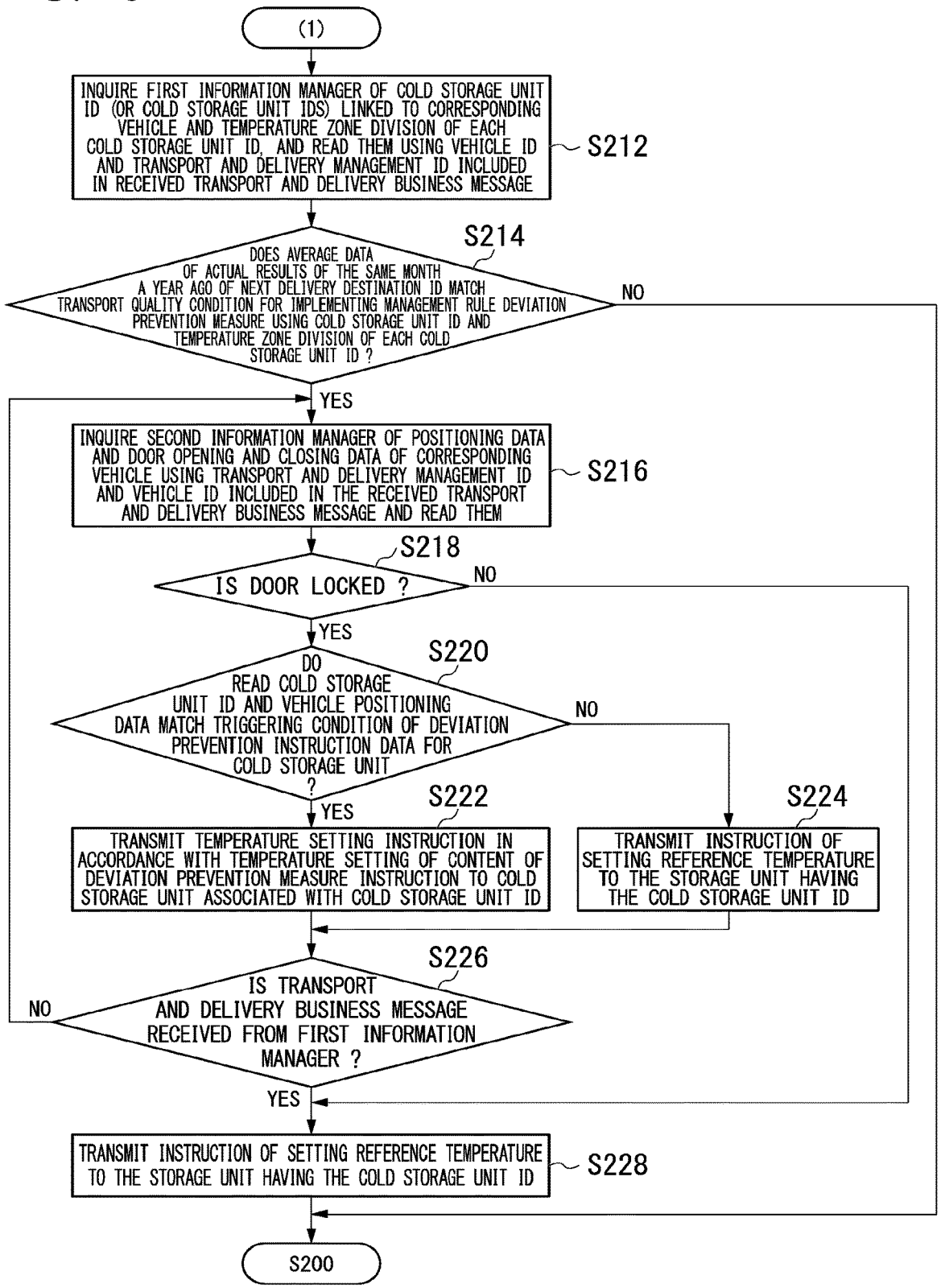
FIG. 18 is a flowchart (2) which shows a flow of processing to be executed by the deviation prevention measure processor 90.

FIG. 18 is a flowchart (2) which shows a flow of processing to be executed by the deviation prevention measure processor 90. After the processing in step S210, the deviation prevention measure processor 90 inquires the first information manager 62 of a cold storage unit ID (or cold storage unit IDs) linked to a corresponding transport vehicle 10 and a temperature zone division of each cold storage unit ID using a vehicle ID and a transport and delivery management ID and reads them. The vehicle ID and the transport and delivery management ID is included in the received transport and delivery business message 66 (step S212). The first information manager 62 can refer to the transport and delivery business information 64 and answer the inquiry.

Next, the deviation prevention measure processor 90 inquires the first information manager 62 to specify the cold storage unit ID linked to the first information manager 62 and the temperature zone division of each cold storage unit ID, and determines whether the average data of actual results of the same month a year ago of a next scheduled delivery destination ID in the transport and delivery business message 66 matches a condition for the specified temperature zone division (step S214). The condition for the specified temperature zone division is a condition in the transport quality condition 92B for implementing a management rule prevention measure. That is, when unloading work was performed at a next delivery destination in the same month a year ago, it is determined whether an internal environment of the cold storage unit 12 satisfied the transport quality condition 92B for implementing a management rule prevention measure.

FIG. 19 is a diagram which shows an example of the transport quality condition 92B for implementing a management rule prevention measure. The transport quality condition 92B for implementing a management rule prevention measure is information in which transport quality conditions at the time of implementing deviation prevention measure are associated with temperature zone divisions (freezing, refrigeration, or a constant temperature). For example, a logical expression is "Condition 1 AND Condition 2." Condition 1 when the temperature zone division is freezing is, for example, that an average temperature rise is 20° C. or more, and Condition 2 when the temperature zone division is freezing is, for example, that an occurrence frequency of a temperature rule deviation is 1/30 or more. Condition 1 when the temperature zone division is refrigeration is, for example, that the average temperature rise is 15° C. or more. Condition 1 when the temperature zone division is a constant temperature is, for example, that the average temperature rise is 10° C. or more. Condition 2 when the temperature zone division is refrigeration and a constant temperature is the same as Condition 2 when the temperature zone division is freezing.

When the transport quality condition 92B for implementing a management rule prevention measure is not matched, the procedure returns to the processing of step S200. When they match with the transport quality condition 92B for implementing a management rule prevention measure, the deviation prevention measure processor 90 inquires the second information manager 70 of positioning data and door opening and closing data of a corresponding vehicle using a transport and delivery management ID and a vehicle ID included in the received transport and delivery business message 66, and reads them (step S216).

Next, the deviation prevention measure processor 90 determines whether the door is locked (step S218). When the door is not locked, the door of the transport vehicle 10 is unlocked and work is already started, and thus an instruction of setting a reference temperature is transmitted to a corresponding cold storage unit ID (step S228). That is, the deviation prevention measure processor 90 transmits information indicating that a temperature setting for the temperature control device 18 is to maintain the reference temperature.

When the door is locked, the deviation prevention measure processor 90 determines whether the read cold storage unit ID and the positioning data of the transport vehicle 10 match a triggering condition of the deviation prevention measure instruction data 92C for the cold storage unit 12 (step S220).

FIG. 20 is a diagram which shows an example of the deviation prevention measure instruction data 92C. The deviation prevention measure instruction data 92C is information in which a type of the cold storage unit 12 and deviation prevention measure instruction content are associated with a cold storage unit ID. The content of a deviation prevention measure instruction includes, for example, a condition for triggering a deviation prevention measure, content of the deviation prevention measure, and a cancellation condition for the deviation prevention measure. The condition for triggering a deviation prevention measure is, for example, that a current location of the transport vehicle 10 enters within a ○○ km range (for example, a 10 km range) from a next delivery destination (a next scheduled delivery destination). The content of the deviation prevent measure is, for example, to set a temperature of a cold storage unit to a minus ○° C. (for example, minus 5° C.) lower than a reference value. The reference value is, for example, a value set to the cold storage unit 12. The cancellation condition for the deviation prevention measure is, for example, that the door of the transport vehicle 10 on which the cold storage unit 12 is mounted is unlocked.

FIG. 21 is a diagram which shows another example of deviation prevention measure instruction data 92D. The condition for triggering a deviation prevention measure may be time instead of distance. For example, the condition for triggering a deviation prevention measure is that predicted time until the transport vehicle 10 arrives at a delivery destination is within a ∘∘ minute zone (for example, a 30 minute zone). In this case, the deviation prevention measure processor 90 calculates an estimated time of arrival at a next delivery destination on the basis of the read positioning data of the transport vehicle 10 and traffic congestion information of an external system. In the processing of step S220, the deviation prevention measure processor 90 may set the triggering condition of deviation prevention measure program data for the cold storage unit 12 to "within 30 minutes as predicted time of an arrival" and the like, and determine whether the triggering condition for deviation prevention measure instruction data for the cold storage unit 12 is matched.

The deviation prevention measure processor 90 may acquire required time corresponding to a plurality of route candidates from an external system. Then, the deviation prevention measure processor 90 can add the shortest required time among the acquired required time to a current time and set the result as arrival predicted time. The external system described above calculates a plurality of route candidates and required time to select respective routes, and transmits a result of the calculation to the deviation prevention measure processor 90 if the positioning data of the transport vehicle 10 and the location data of a next delivery destination are given.

When an arrival predicted time is calculated as described above, the deviation prevention measure processor 90 may calculate arrival predicted time using traffic congestion information on a route from a current location of the transport vehicle 10 to a next delivery destination, which is acquired from the external system. As a result, an arrival predicted time is more accurately calculated.

The content of the deviation prevention measure may be, for example, setting the temperature of a cold storage unit to a temperature lower limit instead of setting the temperature to a minus ∘° C. lower than a reference value. In this case, the deviation prevention measure processor 90 refers to the transport and delivery quality management rule information 84 and sets the temperature lower limit.

Back to the description of FIG. 18, when the triggering condition is matched, the deviation prevention measure processor 90 transmits an instruction in accordance with the temperature setting of the content of a deviation prevention measure instruction for the cold storage unit 12 to the cold storage unit 12 associated with cold storage unit ID (step S222). The temperature control device 18 of the cold storage unit 12 controls the internal temperature of a cold storage unit on the basis of a received instruction. As a result, the inside of the cold storage unit 12 is controlled to a temperature that limits the deviation of a management rule.

When the triggering condition is not matched, the deviation prevention measure processor 90 transmits an instruction of setting a reference temperature for the storage unit having a corresponding cold storage unit ID (step S224). As a result, for example, even if the triggering condition of deviation prevention measure instruction data is matched (for example, the transport vehicle 10 enters within a 10 km range), the temperature setting of the cold storage unit 12 is changed, and then the triggering condition is not matched (for example, when the transport vehicle 10 comes out of the 10 km range), the temperature setting returns to the reference value. As a result, unnecessary temperature control is limited.

The deviation prevention measure processor 90 determines whether the transport and delivery business message 66 has been received from the first information manager 62 (step S226). When the transport and delivery business message 66 of the transport and delivery management data 64B has not been received from the information processor 82, the procedure returns to the processing of step S216.

When the transport and delivery business message 66 is received from the first information manager 62 (for example, when the "status" is changed from "traveling" to "delivery in progress at delivery destination" or the like), the deviation prevention measure processor 90 transmits the instruction of setting a reference temperature to a corresponding cold storage unit ID (step S228). As a result, a temperature set lower than a reference value returns to the reference value. Accordingly, the processing of the present flowchart ends.

According to the processing described above, the deviation prevention measure processor 90 can transmit an instruction in accordance with the temperature setting of a deviation prevention measure instruction content for a target cold storage unit to the temperature control device 18. Then, the temperature control device 18 which has acquired an instruction of temperature setting can perform support such that the internal environment of the cold storage unit 12 does not deviate from a transport quality management rule even if an article is brought in and out after arrival at a delivery destination.

In the processing described above, an example in which the transport vehicle 10 causes the temperature control device 18 to change a set value until a door of a cargo compartment of a vehicle is unlocked after approaching a delivery destination requiring implementation of a deviation prevention measure of a management rule has been described, but the time and method for triggering the deviation prevention measure are not limited thereto. The deviation prevention measure processor 90 may receive information of an arrival or departure at or from the delivery destination via the first information manager 62 as the business report information 64C described above, change a set value of temperature set in the cold storage unit 12 of the transport vehicle 10 from the reference between the arrival at the delivery destination and the departure from the delivery destination, and present an instruction message such as minimizing opening time of the door of the transport vehicle 10 or the cold storage unit 12 or spraying dry ice on a display screen of an electronic device operated by a driver at the time of arrival at the delivery destination. An arrival at a delivery destination not requiring a deviation prevention measure and a departure from the delivery destination may also be detected by a driver's operation of a smartphone or the like.

When it is actually detected that a status of the cold storage unit 12 has deviated from a management rule in addition (instead of) before the status of the cold storage unit 12 deviates from the management rule, the deviation prevention measure processor 90 may transmit information indicating that an environment of the cold storage unit 12 has deviated from the management rule to the driver or the like by email and like. For example, the deviation prevention measure processor 90 inquires the first information manager 62 of a delivery base, a temperature zone, and a cold storage unit ID (or cold storage unit IDs) linked to a corresponding transport and delivery management ID and vehicle ID using the transport and delivery management ID and the vehicle ID included in a received transport and delivery business message 66 and specifies them. Then, the deviation prevention measure processor 90 executes a collation between sensor data of the cold storage unit 12 acquired and specified by the second information manager 70 and the transport quality condition 92B for implementing a management rule prevention measure, and inquires the information processor 82 whether a deviation occurs. Then, the deviation prevention measure processor 90 transmits information indicating that the environment of the cold storage unit 12 deviates from the management rule to the driver or the like when the occurrence of a deviation is detected in a response to the inquiry.

An arrival time at a delivery destination or a departure time from a delivery destination acquired by the first information manager 62 may also be acquired by the following method. For example, the first information manager 62 may acquire the arrival time or departure time on the basis of operation information output by an operation that the driver of the transport vehicle 10 performs on a smart phone or a drive recorder. The smart phone or the drive recorder may combine a location address of a delivery destination, a current location of the transport vehicle 10, location information of the delivery destination of the transport and delivery business information 64, and a status of the transport vehicle 10 (a movement speed, vibration, the number of engine rotations, and the like), and detect that the transport vehicle 10 has arrived at or has departed from a delivery destination.

The first information manager 62 receives, for example, a vehicle ID, a transport and delivery management ID in execution, a type "delivery destination arrival" of the business report information 64C, and a business report time of the business report information 64C according to a driver's operation of a smart phone or drive recorder, and refers to the transport and delivery management data 64B to guide a positioning device ID mounted in the transport vehicle 10 searched by the collation between the transport and delivery management TD and the vehicle ID. Then, the first information manager 62 may inquire the second information manager 70 of positioning data of the business report time of the business report information 64C corresponding to the positioning device ID to acquire it, collate the acquired positioning data with delivery destination location data of the transport and delivery business information 64, and obtain a near delivery destination, thereby determining that the delivery destination has been reached.

The first information manager 62 may automatically detect arrival at a delivery destination or a departure from a delivery destination from transition of the positional information of the transport vehicle 10 with respect to the delivery destination. The first information manager 62 may collect dynamic information of a driver, and automatically detect a business status (the transport vehicle 10 is traveling, taking a break, unloading, and the like). The dynamic information of a driver is acquired by, for example, a dynamic detection sensor attached to the driver's body (for example, the wrist). The dynamic detection sensor transmits the acquired dynamic information to the logistics support device 50 via the communication device 22 using wireless communicator provided therein.

As described above, the transport and delivery business message 66 may be generated from the business report information 64C received by the first information manager 62 and a trigger to cause the deviation prevention measure processor 90 to determine a necessity of triggering a management rule deviation prevention measure may be created, but, in addition to this, the first information manager 62 may inquire the second information manager 70 of transport environmental data such as temperature acquired by the sensor device 16 and positional information of the transport vehicle 10, that the second information manager 70 receives every moment periodically, for example, every three minutes, from the start to the end of the transport and delivery business of each transport and delivery management ID to acquire them, and may use them as an opportunity of determining the necessity of triggering a management rule deviation prevention measure for the deviation prevention measure processor 90.

For example, in a case in which the transport vehicle 10 performs deliveries to a plurality of delivery destinations in a package unit to which a transport environment sensor device for temperature or the like is attached, when the sensor device 16 transmits acquired data to the logistics support device 50 via the communication device 22, the first information manager 62 may detect unloading of a package by combining the positional information of the transport vehicle 10 periodically acquired from the second information manager 70, data of the sensor device 16 received via the communication device 22 provided in the transport vehicle 10, a communication status between the communication device 22 and the sensor device 16, and the like, and use it as an opportunity of determining the necessity of triggering a management rule deviation prevention measure for the deviation prevention measure processor 90. Detecting the unloading of a package by combining the positional information of the transport vehicle 10 and the data of a sensor device received via the communication device 22 provided in the transport vehicle 10 is to determine that a package to which the sensor device is attached is unloaded at the delivery destination, for example, when it is detected that communication between the communication device 22 and one sensor device 16 is disconnected for a fixed period, the positional information of the transport vehicle 10 at a time at which the communication disconnection has occurred has a fixed distance or less from the positional information of a delivery destination, and the position of the transport vehicle 10 is apart from the position at the time of occurrence of the communication disconnection by a certain distance or more.

According to the first embodiment described above, the supporter 80 performs statistics processing on environmental information regarding an environmental change inside a cold storage unit when the transport vehicle 10 stays at a work place (for example, a delivery destination) at which work is performed on an article stored in the storage unit in a delivery business, and outputs an instruction before the cold storage unit arrives at the delivery destination on the basis of a result of the statistics processing, thereby performing support such that an environment inside the cold storage unit does not deviate from a management rule.

Second Embodiment

Hereinafter, a second embodiment will be described. In the second embodiment, the third information manager 86 executes daily batch processing in addition to the monthly batch processing executed in the first embodiment, and further accumulates results of statistics processing by performing the statistics processing on transport and delivery quality accumulation data. In the following description, differences from the first embodiment will be mainly described.

Figure 22:
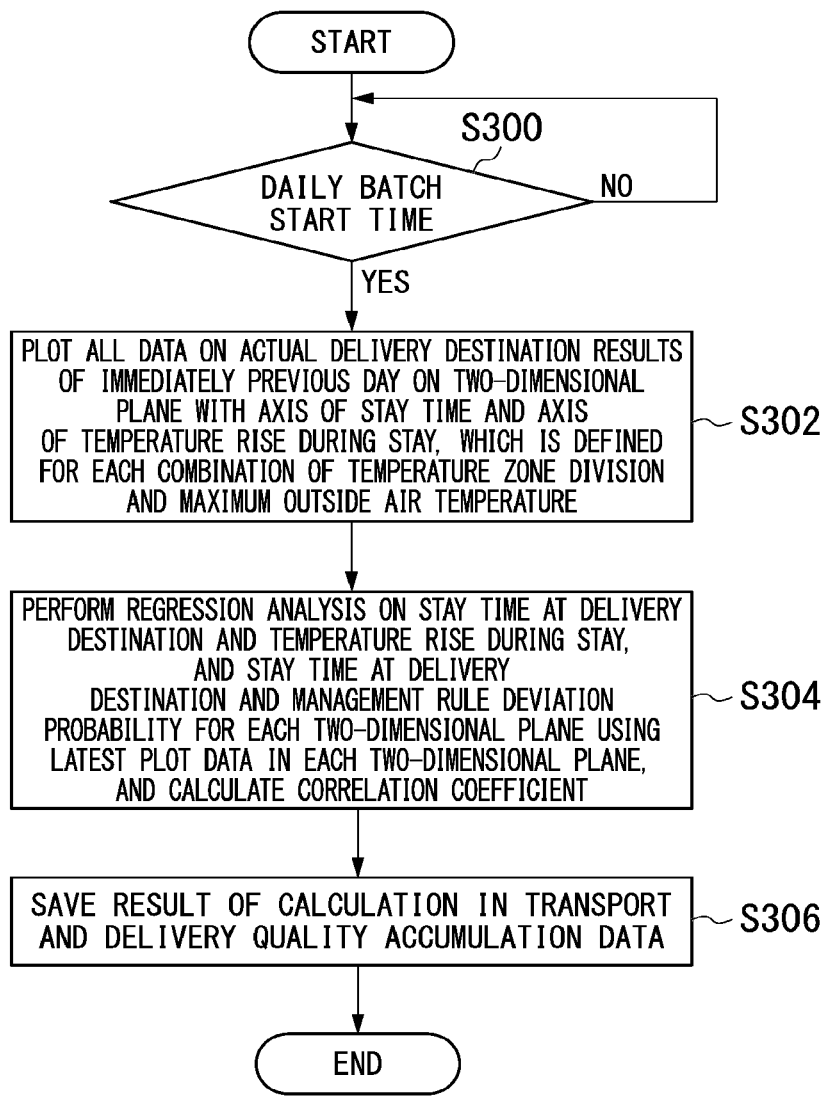
FIG. 22 is a flowchart which shows a flow of processing to be executed by the third information manager 86 of a second embodiment.

FIG. 22 is a flowchart which shows a flow of processing to be executed by the third information manager 86 of the second embodiment. First, the third information manager 86 waits until it is a time to start a daily batch (step S300). When it is the time to start a daily batch, the third information manager 86 plots all data on actual delivery destination results of an immediately previous day on a two-dimensional plane with an axis of stay time and an axis of a temperature rise during a stay, which is defined for each combination of a temperature zone division and a maximum outside air temperature (step S302).

Next, the third information manager 86 performs a regression analysis on stay time at a delivery destination and a temperature rise during a stay, and the stay time at a delivery destination and a deviation occurrence probability from a management rule for each two-dimensional plane using latest plot data in each two-dimensional plane, and calculates correlation coefficients to be described below (step S304). Next, the third information manager 86 saves a result of the calculation in step S304 in the transport and delivery quality accumulation data 88 (step S306). As a result, one routine processing of the present flowchart ends.

The statistics processing of the transport and delivery quality accumulation data 88 performed by the third information manager 86 may be executed, for example, whenever the accumulation data 85 regarding a determined amount of new transport and delivery quality is received from the information processor 82 and is accumulated instead of a daily batch.

Figure 23:
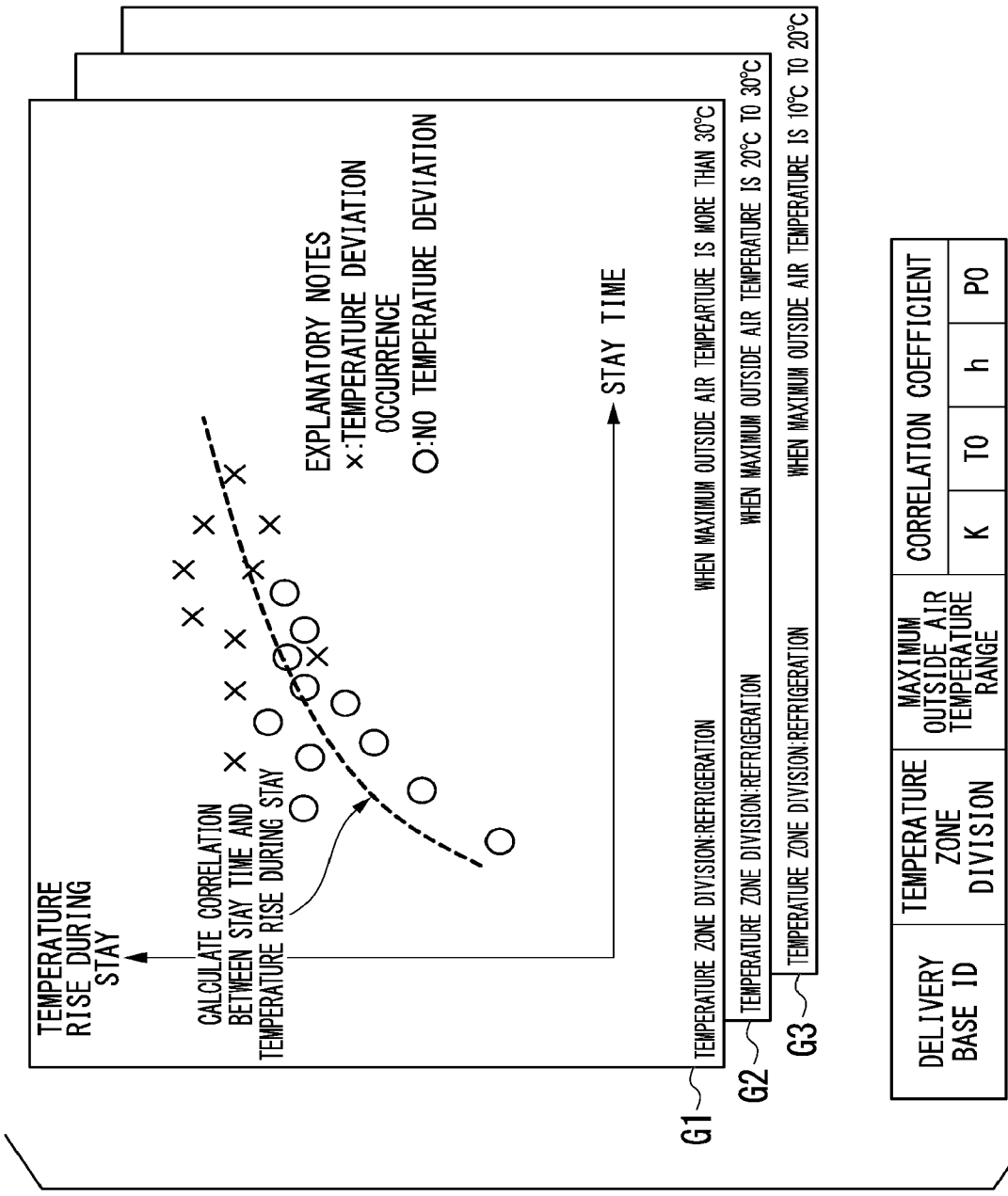
FIG. 23 is a diagram which shows an example of graphs G1 to G3 in which all data on actual delivery destination results is plotted and coefficients of a correlation function.

FIG. 23 is a diagram which shows an example of graphs G1 to G3 in which all data on actual delivery destination results is plotted and coefficients of a correlation function. When there is no distinction among the graphs G1 to G3, they are simply referred to as a graph G. The graph G in an upper diagram of FIG. 23 is prepared for every combination of a temperature zone division set in the cold storage unit 12 and a predetermined maximum outside air temperature. The graphs G1 to G3 are graphs when the temperature zone divisions are set to refrigeration and respective maximum outside air temperatures are different temperatures (for example, "over 30° C.," "20-30° C.," and "10–20° C.").

A vertical axis of the graph G indicates a degree of a temperature rise while the transport vehicle 10 stays at a delivery destination, and the horizontal axis indicates time while the transport vehicle 10 stays at the delivery destination. In FIG. 23, a symbol "x" and a symbol "o" are symbols to be plotted by the third information manager 86, and the symbol "x" indicates that a temperature deviation has occurred, and the symbol "o" indicates that the temperature deviation has not occurred.

Equation (1) for calculating a temperature rise from stay time is calculated based on a correlation between the plotted stay time and temperature rise. "t" in Equation (1) is stay time at a delivery destination. "T0" is a value that a temperature rise range while the door of the cold storage unit 12 is opened asymptotically approaches. "T0" is, for example, the maximum outside air temperature. "k" is a correlation coefficient. The deviation prevention measure processor 90 calculates an expected temperature rise [Tup] on the basis of Equation (1).

$$Tup=-T0\exp(-kt)-T0 \quad (1)$$

Equation (2) for calculating a deviation occurrence probability from stay time is calculated based on a correlation between the plotted stay time and the occurrence of deviation. "t" in Equation (2) is stay time at a delivery destination. "P0" is a value that the deviation occurrence probability from a management rule while the door of the cold storage unit 12 is opened asymptotically approaches. "P0" is, for example, a probability of 100%. "h" is a correlation coefficient. The deviation prevention measure processor 90 calculates the deviation occurrence probability from a management rule "P" on the basis of Equation (2).

$$P=-P0\exp(-ht)+P0 \quad (2)$$

As described above, the third information manager 86, as shown in a lower diagram of FIG. 23, associates a delivery base ID, a temperature zone division, and a range of maximum outside air temperature with the calculated correlation coefficients "k," "T0," "h," and "P0", and save them in the transport and delivery quality accumulation data 88.

Figure 24:
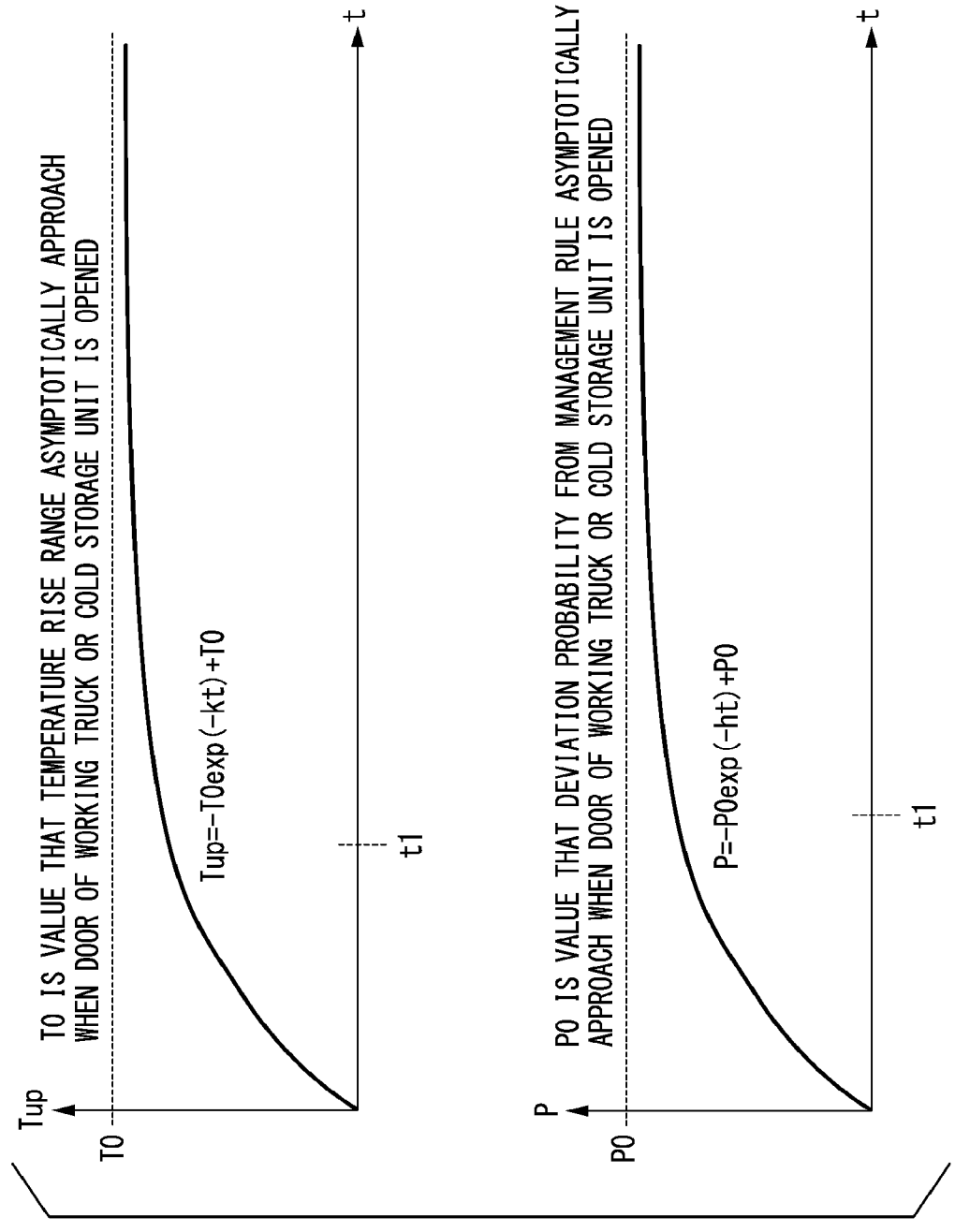
FIG. 24 is a diagram in which graphs corresponding to Equation (1) and Equation (2) are drawn.

FIG. 24 is a diagram in which graphs corresponding to Equation (1) as described above and Equation (2) to be described below are drawn. The upper diagram is a diagram in which the graph corresponding to Equation (1) is drawn. The vertical axis is a temperature rise "Tup," and the horizontal axis is stay time at a delivery destination. In Equation (1), for example, the temperature rise sharply rises around a time t1, and then asymptotically approaches "T0."

The lower diagram is a diagram in which the graph corresponding to Equation (2) is drawn. The vertical axis is a deviation occurrence probability "P" and the horizontal axis is stay time "t" at a delivery destination. In Equation (2), for example, the deviation occurrence probability from a management rule sharply rises around the time t1, and then asymptotically approaches "P0."

Figure 25:
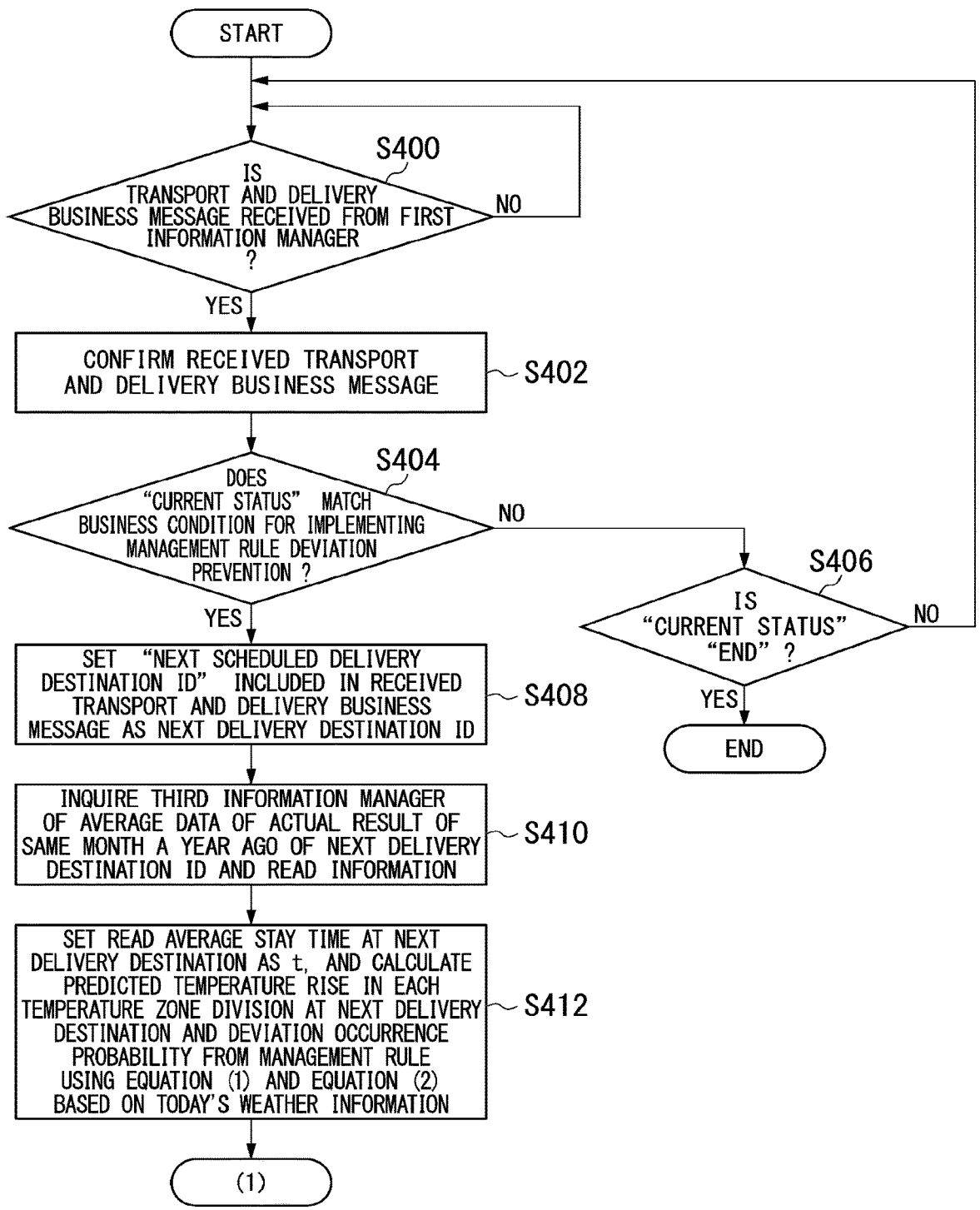
FIG. 25 is a flowchart (1) which shows a flow of processing to be executed by the deviation prevention measure processor 90 of the second embodiment.

FIG. 25 is a flowchart (1) which shows a flow of processing to be executed by the deviation prevention measure processor 90 of the second embodiment. Processing in steps S400 to S410 in FIG. 25 is the same as the processing in steps S200 to S210 in FIG. 16 described above, and thus description thereof will be omitted. After processing of step S410, the deviation prevention measure processor 90 sets average stay time at a next delivery destination read in step S410 as "t," and calculates a temperature rise predicted in each temperature zone division at the next delivery destination and the deviation occurrence probability from a management rule using Equation (1) and Equation (2) based on today's weather information (step S412).

Figure 26:
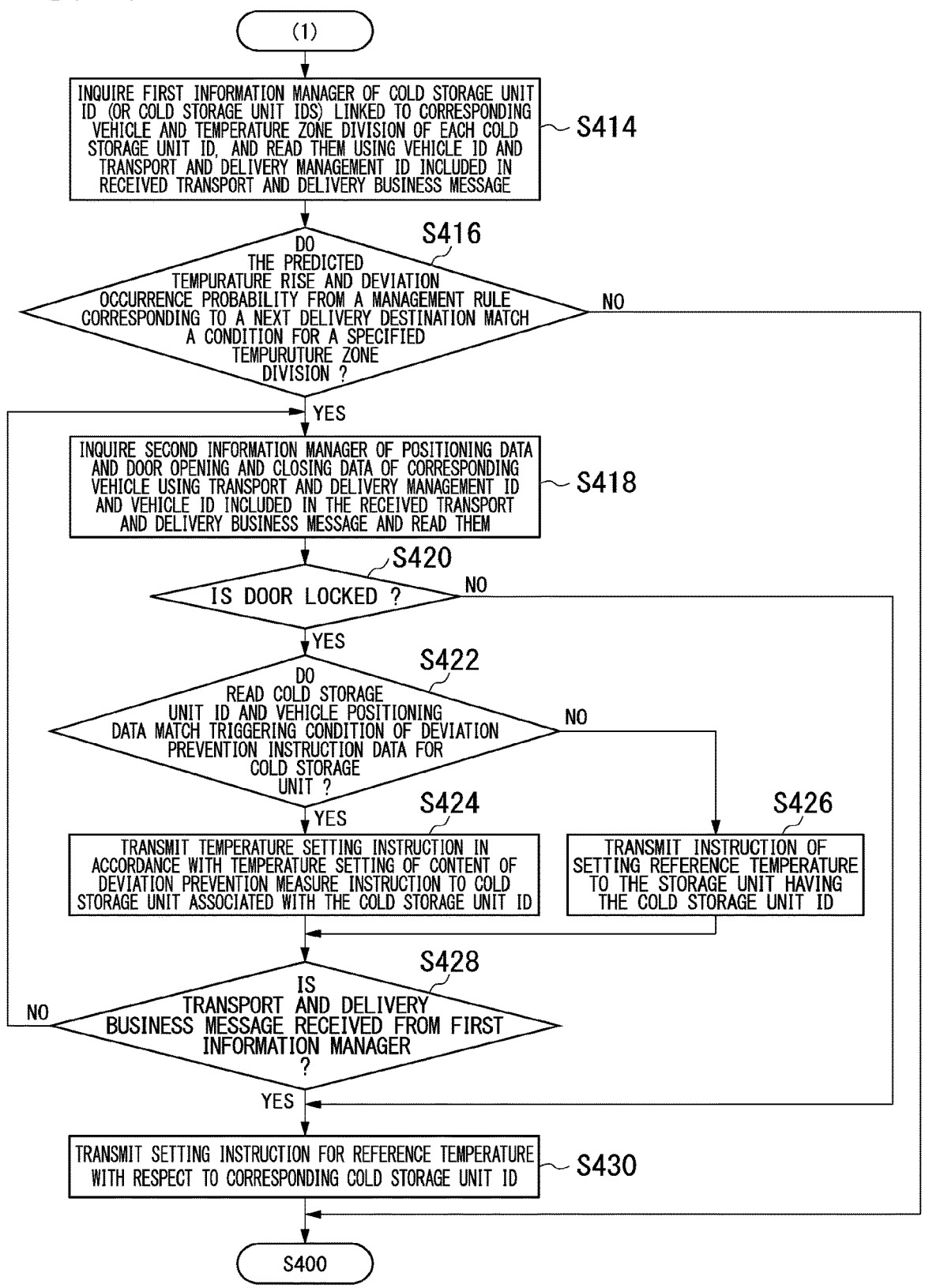
FIG. 26 is a flowchart (2) which shows a flow of the processing to be executed by the deviation prevention measure processor 90 of the second embodiment.

FIG. 26 is a flowchart (2) which shows a flow of the processing to be executed by the deviation prevention measure processor 90 of the second embodiment. In the flowchart of FIG. 26, since processing of step S214 in the flowchart of FIG. 16 is changed to the processing of step S416, and thus only a change point will be described. The deviation prevention measure processor 90 inquires the first information manager 62 to specify a cold storage unit ID and a temperature zone division of each cold storage unit ID, and determines whether the predicted temperature rise and deviation occurrence probability from a management rule corresponding to a next delivery destination match a condition for a specified temperature zone division (step S416). The condition for a specified temperature zone division is a condition in the transport quality condition 92B for implementing a management rule prevention measure to be described below. When the transport quality condition 92B for implementing a management rule prevention measure is matched, the procedure proceeds to processing of step S418, and, when the transport quality condition 92B for implementing a management rule prevention measure is not matched, the procedure returns to the processing of step S400.

FIG. 27 is a diagram which shows an example of the transport quality condition 92B for implementing a management rule prevention measure of the second embodiment. The transport quality condition 92B for implementing a management rule prevention measure is information in which a transport quality condition at the time of implementing a deviation prevention measure is associated with a temperature zone division (freezing, refrigeration, or a constant temperature). For example, a logical expression is "Condition 1 AND Condition 2." Condition 1 when the temperature zone division is freezing is, for example, that the temperature rise predicted by Equation (1) described above is 20° C. or above, and Condition 2 when the temperature zone division is freezing is, for example, that the deviation occurrence probability from a temperature rule calculated by Equation (2) described above is 1/30 or more. Condition 1 when the temperature zone division is refrigeration is, for example, that the predicted temperature rise is 15° C. or above. Condition 1 when the temperature zone division is a constant temperature is, for example, that the predicted temperature rise is 10° C. or above. Condition 2 when the temperature zone division is refrigeration and a constant temperature is similar to Condition 2 when the temperature zone division is freezing.

As described above, since it is determined whether to implement a management rule prevention measure according to the predicted temperature rise and the predicted deviation occurrence probability from a temperature rule, a temperature rise in a cold storage unit is limited.

According to the second embodiment described above, the deviation prevention measure processor 90 implements a deviation prevention measure on the basis of a correlation between the stay time at a delivery destination and the temperature rise during a stay, which are calculated by the third information manager 86, and a correlation between the stay time at a delivery destination and the deviation occurrence probability from a management rule, thereby achieving the same effect as that of the first embodiment.

Third Embodiment

Hereinafter, a third embodiment will be described. In the third embodiment, the logistics support device 50 includes a learner 100 and executes processing on the basis of a result of learning by the learner 100. Hereinafter, a difference from the first embodiment will be mainly described.

Figure 28:
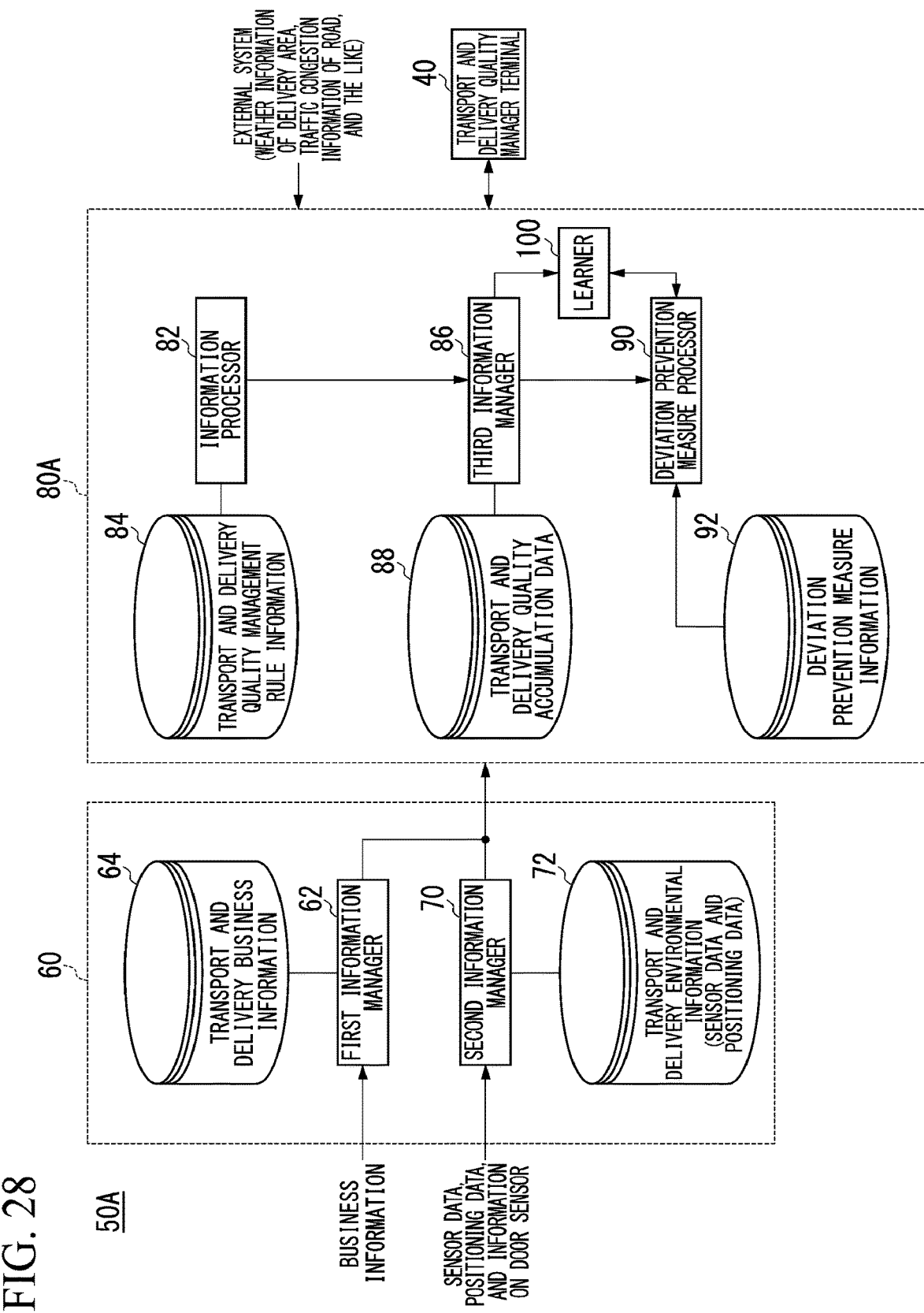
FIG. 28 is a diagram which shows a functional configuration of a logistics support device 50A of a third embodiment.

FIG. 28 is a diagram which shows a functional configuration of a logistics support device 50A of the third embodiment. The supporter 80A of the logistics support device 50A includes a learner 100. The learner 100 learns a relationship among a triggering condition for deviation prevention measure instruction content, the content of an instruction, and a probability that a deviation from a management rule of an article specified in the transport and delivery quality management rule information 84 may occur, on the basis of information acquired by the third information manager 86. The supporter 80A derives a combination of the triggering condition for deviation prevention measure instruction content and the content of an instruction in which a probability that a deviation from a management rule may occur is equal to or less than a threshold value on the basis of a result of the learning, and outputs a result of the derivation to the deviation prevention measure processor 90, a display device of the logistics support device 50, other terminal devices, and the like. A manager of the logistics support system 1 can select a desired combination by operating an operation device from a combination of the triggering condition for deviation prevention measure instruction content and the content of an instruction displayed on a display device.

Figure 29:
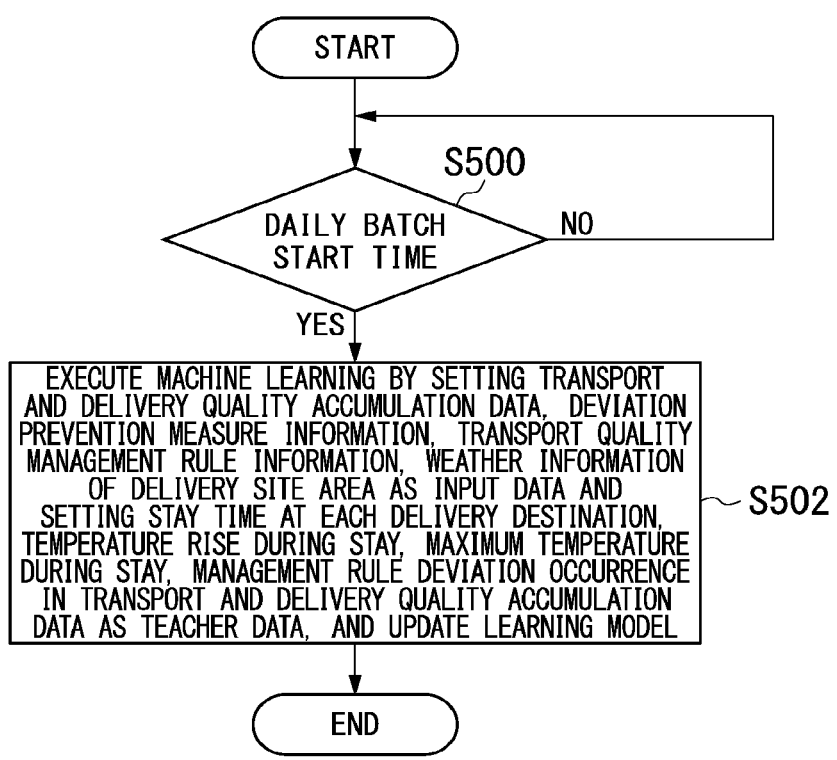
FIG. 29 is a flowchart (1) which shows a flow of processing to be executed by a supporter 80A of the third embodiment.

FIG. 29 is a flowchart (1) which shows a flow of processing to be executed by a supporter 80A of the third embodiment. First, the supporter 80A waits until it is time to start a daily batch (step S500). If it is time to start the daily batch, the learner 100 sets the transport and delivery quality accumulation data 88, the deviation prevention measure information 92, the transport and delivery quality management rule information 84, and weather information of a delivery base area as input data, executes machine learning by setting stay time at each delivery destination, a temperature rise during a stay, a maximum temperature during a stay, a deviation occurrence from a management rule among the transport and delivery quality accumulation data 88 as teacher data, and updates a learning model included in the learner 100 (step S500). As a result, processing of the present flowchart ends.

The update processing of a learning model performed by the learner 100 may be executed, for example, whenever the third information manager 86 receives the accumulation data 85 regarding a determined amount of new transport and delivery quality from the information processor 82 and accumulates it instead of a daily batch.

Figure 30:
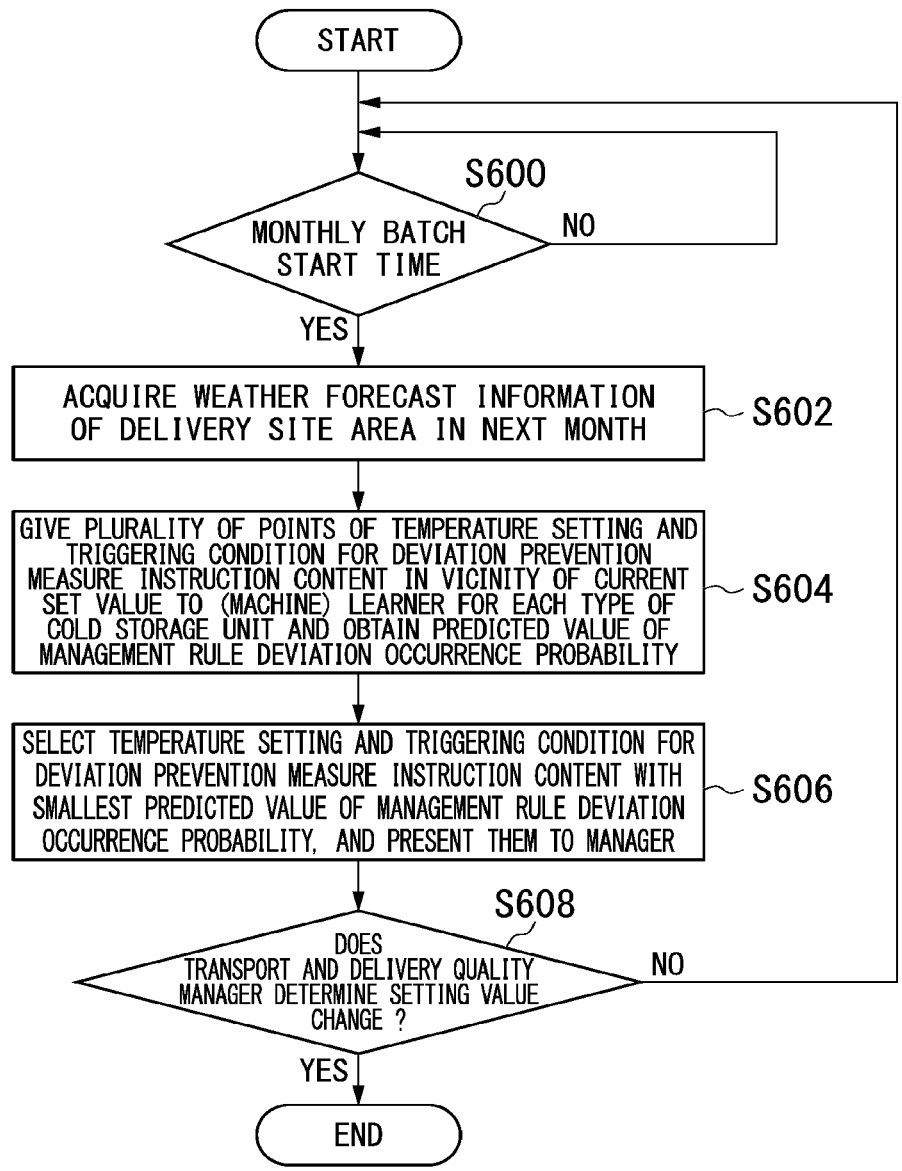
FIG. 30 is a flowchart (2) which shows a flow of the processing to be executed by the supporter 80A of the third embodiment.

The supporter 80A may execute the following processing instead of (in addition to) the processing described above. FIG. 30 is a flowchart (2) which shows a flow of the processing to be executed by the supporter 80A of the third embodiment. First, the supporter 80A waits until it is time to start a monthly batch (step S600). If it is time to start the monthly batch, the learner 100 acquires weather forecast information of a delivery base area of the next month (step S602).

Next, the supporter 80A gives a plurality of points of the triggering condition for deviation prevention measure instruction content and the temperature setting in the vicinity of a current set value to the learner 100 for each type of the cold storage unit 12, and obtains a predicted value of the deviation occurrence probability from a management rule (step S604). The current set value is, for example, a distance which is a condition for triggering a deviation prevention measure of the deviation prevention measure instruction data 92C in FIG. 20 described above, or a temperature of the deviation prevention measure. Specifically, A plurality of points in a case in which the condition for triggering a deviation prevention measure is set to "a current location is within 10 km from a next delivery destination" include, for example, "a current location is within 5 km from a next delivery destination" or "a current location is within 15 km from a next delivery destination," and a plurality of points in the temperature setting of the deviation prevention measure "reference −5° C." include, for example, "reference −8° C." or "reference −2° C."

Next, the supporter 80A selects a temperature setting and a triggering condition for deviation prevention measure instruction content with a smallest predicted value of rule deviation occurrence probability, and presents them to a manager (step S606). Then, the supporter 80A determines whether a transport and delivery quality manager has determined to change the set value (step S608). When it is not determined to change the set value, the procedure proceeds to the processing of step S600, and, when it is determined to change the set value, the processing of the present flowchart ends. The present processing may be performed as a weekly batch or a daily batch instead of a monthly batch.

With the processing described above, since the supporter 80A can select a temperature setting and a triggering condition for deviation prevention measure instruction content with a smallest predicted value of rule deviation occurrence probability, the environment inside a cold storage unit can be more reliably maintained.

Figure 31:
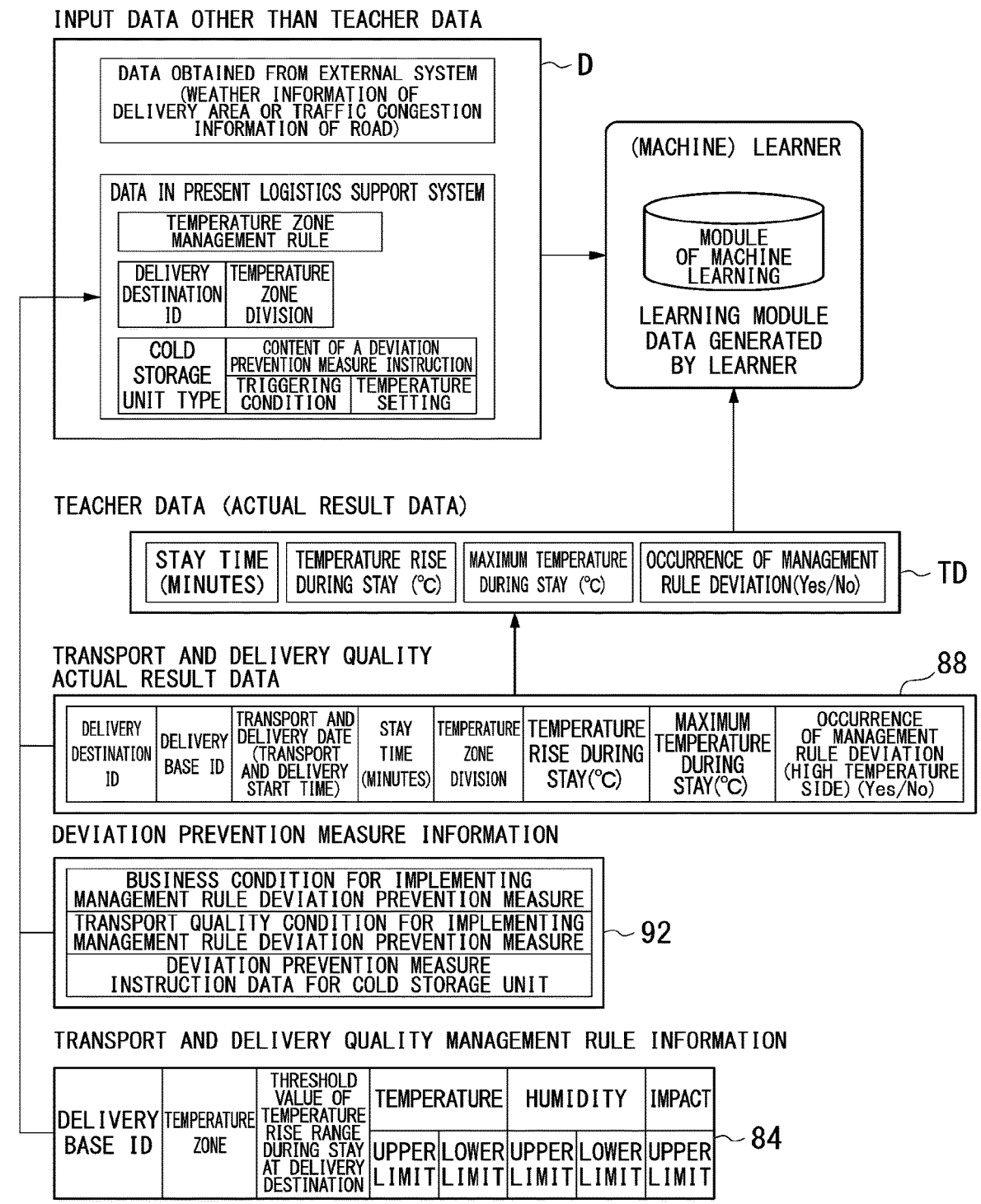
FIG. 31 is a conceptual diagram of information used by a learner 100.

FIG. 31 is a conceptual diagram of information used by the learner 100. The learner 100 uses actual result data obtained from the transport and delivery quality accumulation data 88 as teacher data TD. The teacher data TD is, for example, stay time at a delivery destination (minutes), a temperature rise during a stay (° C.), a maximum temperature during a stay (° C.), and a presence or absence of occurrence of a management deviation. The learner 100 uses data in the logistics support system 1 obtained from the transport and delivery quality accumulation data 88, the deviation prevention measure information 92, or the transport and delivery quality management rule information 84, weather information of a delivery area, traffic congestion information of a road, or the like obtained from an external system, and input data D other than the teacher data. The input data D in the logistics support system 1 is, for example, a temperature zone management rule, a delivery destination ID, a temperature zone division, a type of the cold storage unit 12, or content of a deviation prevention measure instruction (triggering condition and temperature setting). The learner 100 generates a learning model using the information described above, and selects, for example, a temperature setting and a triggering condition for deviation prevention measure instruction content with a smallest predicted value of a rule deviation occurrence probability using a generated learning model.

In processing of "giving a plurality of points of a triggering condition for deviation prevention measure instruction content and a temperature setting in the vicinity of a current set value to the learner 100 for each type of the cold storage unit 12 and obtaining a predicted value of a management rule deviation occurrence probability" of monthly batch processing (step S606), which is executed by the learner 100 using the transport and delivery quality accumulation data 88 in the flowchart in FIG. 30 described above, a method (range and division) of selecting the plurality of points in the vicinity of a set value" given to the learner 100 may be set in the logistics support device 50 by a manager in advance.

For "selecting a temperature setting and a triggering condition for deviation prevention measure instruction content with a smallest "predicted value of a rule deviation occurrence probability and presenting them to the manager" of monthly batch processing executed by the learner 100 described above using transport and delivery quality data 88 in the flowchart of FIG. 30, in addition to simply presenting a temperature setting or a triggering condition in which the predicted value of a deviation occurrence probability is a minimum, for example, a maximum allowable value of the predicted value of a deviation occurrence probability and a limit to a predicted amount of additional power consumption with respect to a reference setting may be set as a condition and presented to a manager. In the following description, an example of the method will be described below.

For example, the reference cold storage unit temperature setting data 102 shown in FIG. 32 is stored in the storage unit device of the logistics support device 50. The reference cold storage unit temperature setting data 102 is information in which a cold storage unit ID, a type of the cold storage unit 12, and a set reference temperature are associated with one another. The learner 100 obtains the local delivery destination weather information 104 shown in FIG. 33 from an external system. The local delivery destination weather information 104 is an average daytime outside air temperature by month.

Here, the power consumption data of the cold storage unit 12 depends on a difference between an outside air temperature and a target set temperature inside the cold storage unit 12 and a maximum power consumption of the cold storage unit 12. FIG. 34 is a diagram which shows an example of the cold storage unit power consumption table 106. As illustrated, the maximum power consumption of cold storage unit 12 of a cold storage unit A is determined by the outside air temperature and the set temperature inside the cold storage unit 12. The cold storage unit power consumption table 106 is stored in the storage unit device of the logistics support device 50.

For example, when a reference temperature setting of the cold storage unit A is set to minus 18 [° C.], if the outside air temperature is 25 [° C.], the cold storage unit A consumes power of 63 [W], but, when a reference value minus 5 [° C.] is set as the target temperature setting, 68 [W] is consumed and additional power consumption is derived as 5 [W]. In this example, since the average daytime outside air temperature in May is 25 [° C.], the additional power consumption Pup of the cold storage unit A is calculated to be 5 [W] on average in a daytime transport and delivery in May.

It is assumed that the maximum allowable value of the predicted value of a deviation occurrence probability given to the learner 100 is set to 1/30, and a plurality of sets of a triggering condition and a temperature setting (that is, set values of the target temperature for deviation prevention) of the cold storage unit A, for example, in May for each delivery destination, which meets this condition, are derived by the learner 100. When the triggering condition is an expected time until an arrival, this expected time becomes time at which a temperature setting (prevention measure) is different from a reference, a total amount of additional power consumption of the cold storage unit A in May with respect to the reference is obtained by the following Equation (3). Furthermore, the logistics support device 50 can present to the manager only a combination of a triggering condition and a temperature setting in which the total amount of additional power consumption described above is within a limit condition set in advance. In Equation (3), Eup is the amount of additional power consumption, ID is a delivery destination, Pup is additional power consumption, and Tprev is time for triggering a prevention measure.

$$Eup = \Sigma(ID)\{(Pup) \times (Tprev\_ID)\} \quad (3)$$

As described above, since the supporter 80A can extract only the combination of a triggering condition and a temperature setting in which the total amount of additional power consumption is within a limit condition set in advance on the basis of the plurality of sets of a triggering condition and a temperature setting derived by the learner 100, the quality of transport and delivery products can be maintained while the power consumption is limited.

According to the third embodiment described above, the learner 100 can learn a relationship among a triggering condition of an instruction, content of an instruction, and a probability that a deviation from a transport and delivery quality management rule occurs on the basis of the information acquired by the third information manager 86, and the supporter 80A can derive the combination of the triggering condition of an instruction and the content of an instruction in which the probability that the deviation from a transport and delivery quality management rule occurs is equal to or less than a threshold value. As a result, the manager of the logistics support system 1 can select a triggering condition of desired deviation prevention measure instruction content and the content of an instruction to support the environment inside a cold storage unit such that it does not deviate from a management rule.

In the present embodiment, it is described that processing is executed by a cloud computing using a device connected by a network NW, but a part of the processing executed by the supporter 80A is not limited thereto and may be executed by a device which is mounted in or brought into a storage unit or the transport vehicle 10. For example, a portable terminal device (a smartphone) brought into the transport vehicle 10 may acquire a result of the statistics processing executed by the third information manager 86, and output an instruction before an arrival at a work place (for example, a delivery destination) on the basis of the acquired result when a storage unit for storing an article is mounted in a moving body and a delivery of the article is performed. In this case, the deviation prevention measure information 92 is stored in a storage unit device of the portable terminal device.

In the present embodiment, it is described that the first information manager 62 inquires the second information manager 70 as necessary to transmit information that triggers a determination on the necessity of triggering a transport and delivery management rule deviation prevention measure to the deviation prevention measure processor 90, but the method of triggering a determination on the necessity of triggering a transport and delivery management rule deviation prevention measure is not limited thereto. For example, the information processor 82 of the supporter 80 may inquire the first information manager 62 or the second information manager 70 of a change in the transport and delivery business information 64 or the transport and delivery environmental information 72 periodically, for example, every three minutes, to acquire it, and inquire the deviation prevention measure processor 90 to transmit information serving as a trigger for determining the necessity of triggering a transport and delivery management rule deviation prevention measure, or the deviation prevention measure processor 90 itself may periodically inquire the first information manager 62 or the second information manager 70 of a change in the transport and delivery business information 64 or the transport and delivery environmental information 72 to acquire it, and determine the necessity of triggering a transport and delivery management rule deviation prevention measure.

According to at least one embodiment described above, the third information manager 86 which executes statistics processing on environmental information regarding an environmental change inside a storage unit when the storage unit for storing an article is mounted in a moving body and stays in a work place at which work is performed on the article stored in the storage unit in the delivery business, and the deviation prevention measure processor 90 which outputs an instruction when the storage unit for storing an article is mounted in a moving body and a delivery of the article is performed on the basis of a result of the statistic processing of the third information manager 86 are provided, and thereby it is possible to support an environment inside the storage unit such that it does not deviate from a management rule.

While certain embodiments of the present invention have been described, these embodiments have been presented as examples, and are not intended to limit the scope of the invention. These embodiments can be implemented in other various forms, and various omissions, substitutions, and changes can be made without deviating from the gist of the invention. These embodiments and modifications thereof are included in the invention described in the claims and the equivalents thereof as well as in the scope and the gist of the invention.

What is claimed is:

1. A logistics support device comprising:
a deriver configured to perform, when a storage configured to store an article is mounted in a moving body and stays at a work place at which work is performed on the article stored in the storage in a delivery business, statistics processing on environmental information on an environmental change inside the storage;
an instruction controller configured to output an instruction on the basis of a result of the statistics processing of the deriver when the storage configured to store the article is mounted in the moving body and delivery of the article is performed; and
a learner configured to:
machine-learn a relationship among a triggering condition of the instruction, content of the instruction, and a probability of occurrence of deviation in a management rule of the article based on information acquired as the result of the statistics processing of the deriver by the deriver;
update a learning model for preventing deviation in the management rule of the article; and
derive a combination of the triggering condition and the content of the instruction using the learning model, the combination in which the probability of occurrence of deviation in the management rule becomes equal to or less than a threshold value.

2. The logistics support device according to claim 1, wherein the instruction controller outputs an instruction to change an internal environment of the storage before arrival at the work place at which work is performed on the article stored in the storage in the delivery business.

3. The logistics support device according to claim 2, wherein the instruction controller detects an approach to the work place on the basis of one or both of positional information associated with the storage and information indicating a delivery work status of the article.

4. The logistics support device according to claim 3, wherein the instruction controller detects an approach to the work place on the basis of at least one of the work place at which work is performed on the article stored in the storage, a distance between the positional information associated with the storage and the work place, and a predicted time until the moving body in which the storage is mounted arrives at the work place.

5. The logistics support device according to claim 1, wherein the instruction controller outputs the instruction to an environment controller which controls the internal environment of the storage.

6. A logistics support method comprising:
by a computer of a logistics support device,
performing, when a storage configured to store an article is mounted in a moving body and stays at a work place at which work is performed on the article stored in the storage in a delivery business, statistics processing on environmental information on an environmental change inside the storage;
outputting an instruction on the basis of a result of the statistics processing when the storage configured to store the article is mounted in the moving body and delivery of the article is performed;
machine-learning a relationship among a triggering condition of the instruction, content of the instruction, and a probability of occurrence of deviation in a management rule of the article based on information acquired as the result of the statistics processing;

updating a learning model for preventing deviation in the management rule of the article; and deriving a combination of the triggering condition and the content of the instruction using the learning model, the combination in which the probability of occurrence of deviation in the management rule becomes equal to or less than a threshold value.

7. A non-transitory computer-readable storage medium that stores a computer program to be executed by a computer of a logistics support device to perform at least:

perform, when a storage configured to store an article is mounted in a moving body and stays at a work place at winch work is performed on the article stored in the storage in a delivery business, statistics processing on environmental information on environmental change inside the storage;

output an instruction on the basis of a result of the statistics processing when the storage configured to store the article is mounted in the moving body and delivery of the article is performed;

machine-learn a relationship among a triggering condition of the instruction, content of the instruction, and a probability of occurrence of deviation in a management rule of the article based on information acquired as the result of the statistics processing;

update a learning model for preventing deviation in the management rule of the article; and derive a combination of the triggering condition and the content of the instruction using the learning model, the combination in which the probability of occurrence of deviation in the management rule becomes equal to or less than a threshold value.

* * * * *